(12) United States Patent
Kitamura et al.

(10) Patent No.: US 7,064,926 B2
(45) Date of Patent: Jun. 20, 2006

(54) CARTRIDGE CASE WITH CHIP RETAINING FEATURES

(75) Inventors: Kouta Kitamura, Kanagawa (JP); Seiji Tsuyuki, Kanagawa (JP); Hidetoshi Yamamoto, Kanagawa (JP); Yusuke Ishihara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 306 days.

(21) Appl. No.: 10/172,004

(22) Filed: Jun. 17, 2002

(65) Prior Publication Data

US 2003/0002214 A1 Jan. 2, 2003

(30) Foreign Application Priority Data

| Jun. 22, 2001 | (JP) | ............................. 2001-189801 |
| Jul. 4, 2001 | (JP) | ............................. 2001-203523 |
| Jul. 6, 2001 | (JP) | ............................. 2001-206205 |
| Jul. 24, 2001 | (JP) | ............................. 2001-222920 |
| Sep. 17, 2001 | (JP) | ............................. 2001-282174 |

(51) Int. Cl.
*G11B 23/02* (2006.01)

(52) U.S. Cl. .................................................. 360/132

(58) Field of Classification Search ............... 360/132, 360/133; 369/291; 242/348

See application file for complete search history.

(56) References Cited

U.S. PATENT DOCUMENTS

| 6,299,088 B1 * | 10/2001 | Rambosek ................... 242/347 |
| 6,304,416 B1 * | 10/2001 | McAllister et al. ......... 360/132 |
| 6,577,471 B1 * | 6/2003 | Morita et al. ................ 360/132 |

FOREIGN PATENT DOCUMENTS

EP 0 924 701 6/1999

\* cited by examiner

*Primary Examiner*—David Davis
(74) *Attorney, Agent, or Firm*—Sughrue Mion, PLLC

(57) ABSTRACT

A cartridge case 1 for a magnetic tape cartridge comprises a cartridge case 1 consisting of a lower half 2 and an upper half 3. The lower half 2 is provided with retaining ribs 71 each having a retaining slanted surface 71a such that a plate-like cartridge memory 7 is positioned on the retaining slanted surfaces 71a with its one side 7d lowered and is obliquely supported with respect to a bottom plate 28 of the lower half 2. The upper half 3 is provided with supporting members for supporting various non-resilient constituent parts positioned on the lower half 2 and including the cartridge memory 7. The upper half 2 is provided with a stopper rod 77 such that when the upper half 3 is assembled with the lower half 2, the stopper rod 77 reaches a cartridge memory-rising region before the supporting members contact with the non-resilient constituent parts on the lower half 2.

9 Claims, 17 Drawing Sheets

TRANSFERRING DIRECTION

CARTRIDGE CASE WITH CHIP RETAINING FEATURES

FIELD OF THE INVENTION

The present invention relates to a magnetic tape cartridge wherein a cartridge case consisting of an upper half and a lower half accommodates therein a non-contacting type memory (hereinafter referred to as a cartridge memory) in a slanted manner, and more particularly relates to technique improving assembling characteristics of the magnetic tape cartridge.

BACKGROUND OF THE INVENTION

In recent years, magnetic tape cartridges have been provided with a cartridge memory, which stores management information inherent in the cartridge, such as contents stored in the magnetic tape cartridge, kinds of magnetic tape cartridges, etc. Since such a cartridge memory is capable of transmitting and receiving electric power or signals with electromagnetic induction in a non-contacting manner, it is accommodated in the cartridge case of the magnetic tape cartridge.

Of these magnetic tape cartridges provided with a cartridge memory, and especially magnetic tape cartridges which satisfy LTO (Linear Tape Open) standard, in consideration of readiness to design a magnetic circuit which causes the cartridge memory electromagnetic induction in a recording/playback device, as shown in FIG. 16, a rectangular-shaped thin plate-like cartridge memory 110 is arranged obliquely with respect to a bottom plate 103 of a lower half 102.

In the lower half 102 of the conventional magnetic tape cartridge as illustrated in FIG. 16, one bottom side 110a of the cartridge memory 110 is engaged with protrusions 108 projecting from the bottom plate 103 of the lower half 102, and a center part of the cartridge memory 110 is supported by two retaining ribs 104 projecting from the bottom plate 103 of the lower half 102 such that the cartridge memory 110 slants by 45 degrees with respect to the bottom plate 103. Furthermore, in order to prevent the cartridge memory 110 from sliding at the bottom side 110a, rod-like restriction pins 105 projecting from the bottom plate 103 of the lower half 102 hold both sides of the cartridge memory 110.

A pair of memory supporting strips 115 is provided inwardly of a side wall 113 of an upper half 112 and parallelly to the retaining ribs 104 of the lower half 102 for supporting the top surface of the cartridge memory 110. The lower end of each memory supporting strip 115 is formed as a supporting slanted surface 115a slanted by 45 degree with respect to the bottom plate 103 so that upon assembling the upper half 112 and the lower half 102, the cartridge memory 110 is sandwiched between the memory supporting surfaces 115a and the retaining ribs 104.

When assembling the magnetic tape cartridge including the cartridge memory 110, a reel around which a magnetic tape is wound is positioned in the middle of the lower half 102, and subsequently other elements such as a safety lug, a cartridge memory 110, a release pad, a lock plate, and spring member for urging the lock plate in one direction are arranged in predetermined positions of the lower half 102 or the reel. Finally, the upper half 112 is assembled with respect to the lower half 102 and fixed by screws, so that the cartridge memory 110 is sandwiched and supported between the retaining ribs 104 of the lower half 102 and the memory supporting strips 115 of the upper half 112.

However, the shape of the lower half 102 to accommodate constituent elements and each constituent element have slight dimensional errors. Therefore, when the upper half 112 is assembled with the lower half 102, each constituent element arranged in the lower half 102 bumps against the corresponding space of the upper part into which each constituent element is fitted. As a result, correction of the position of each constituent element is required upon carrying out the assembly. If these constituent elements are not made from a resilient material such as spring, vibration occurs for each constituent element during the assembly, leading to a possible rise of the cartridge memory 110 due to the vibration.

If the upper half 112 is assembled with the lower half 102 while the cartridge memory 110 has been rising, there are some possible drawbacks that the cartridge memory 110 is broken by the memory supporting strips 115 of the upper half 112, and that the cartridge memory 110 is deviated from the predetermined retaining position, resulting a read/write error of the cartridge memory 110.

When the magnetic tape cartridge 110 is adapted to large-scale production by the use of an assembling device, the lower half 102 and the upper half 112 of the magnetic tape cartridge or other internal parts are in turn assembled while they are arranged in transferring pallets and carried with a conveyor. However, acceleration will arise due to accelerated or decelerated transferring pallet at the moment the transferring pallet is moved or stopped. Since the cartridge memory 110 is a extremely light element and positioned obliquely with respect to the lower half 102, the cartridge memory 110 would rise due to an impact caused by this acceleration. The cartridge memory 110 would also rise due to vibration of the transferring conveyor and the like.

In order to prevent rising of the cartridge memory 110, in a conventional method, the cartridge memory 110 is adhered with glue to the lower half 102.

However, when glue 120 is applied to the retaining ribs 104 to attach the cartridge memory 110 on the retaining ribs 104, as best seen in FIG. 17 that is a side elevation viewing from the arrow Z of FIG. 16, the cartridge memory 110 slightly floats from the retaining ribs 104 because of glue 120. For this reason, a press jig 116 for attachment is employed. The press jig 116 has a pressing portion to press the upper surface of the cartridge memory 110. When the press jig 116 presses the cartridge memory 110 at the pressing portion, the cartridge memory 110 is pulled in the diagonally downward direction because of a frictional force raised between the press jig 116 and the cartridge memory 110. As the result, the cartridge memory 110 is deviated from the predetermined assembling position.

Such a defective positioning results in a read/write error of the cartridge memory 110, and in some cases, the cartridge memory 110 would be broken upon assembling the upper half 112 and the lower half 102.

When the cartridge memory 110 is automatically assembled with the aforementioned magnetic tape cartridge by means of the assembling device, a robot having suction means may be employed.

However, as shown in FIG. 16, a globe top 110b for sealing an IC chip of the cartridge memory 110 swells as a ridge, comparing with other parts of the cartridge memory 110. For this reason, if the cartridge memory 110 is supplied to the assembling device with the globe top faced downward, the printed board is liable to tilt, which causes a gap between the suction means and the cartridge memory 110. Therefore, the suction means often fails to pick up the cartridge memory properly. Furthermore, the suction means often contacts with the reel around which the magnetic tape is wound, which prevents assembly of the cartridge memory in the proper position.

With the foregoing drawbacks of the prior art in view, the purpose of the present invention is to improve the upper half, the lower half, and the cartridge memory of the cartridge case, thereby improving assembling characteristics of the cartridge memory as well as preventing defective assembly of the magnetic tape cartridge.

It is another object of the present invention to provide improvements in the method of assembling the cartridge memory with respect to the magnetic tape cartridge and in the press jig for attachment for positioning the cartridge memory in a predetermined position, thereby preventing defective assembly of the magnetic tape cartridge.

It is still another object of the present invention to ensure that an assembling device, which carries out assembly of the cartridge memory with respect to the magnetic tape cartridge, suctions the cartridge memory with the suction means and that the suctioned cartridge memory is assembled accurately, thereby preventing defective assembly of the cartridge memory.

SUMMARY OF THE INVENTION

The above object of the present invention can be accomplished by a cartridge case for a magnetic tape cartridge comprising:

a cartridge case consisting of a lower half and an upper half, the lower half being provided with a memory retaining portion such that a plate-like cartridge memory is positioned on the memory retaining portion with its one side lowered and is obliquely supported with respect to a bottom plate of the lower half, and the upper half being provided with supporting members for supporting various non-resilient constituent parts positioned on the lower half and including the cartridge memory;

wherein the upper half is provided with a stopper member such that when the upper half is assembled with the lower half, the stopper member reaches a cartridge memory-rising region before the supporting members contact with the non-resilient constituent parts on the lower half.

With such a constitution of the cartridge case, when the upper half is assembled with the lower half after respective constituent parts are assembled onto the lower half, the stopper member reaches the cartridge memory-rising region indicating a spatial region where the cartridge memory obliquely retained on the lower half would possibly rise, before the constituent parts contact with the upper half. Therefore, even in the case that any of the constituent parts contacts with the supporting members of the upper half and vibration and impact occurs, rising of the cartridge memory is prevented by the stopper member, and if the cartridge memory is about to rise, it will fall down to the original position. Accordingly, it is possible to assemble the cartridge memory in the same predetermined retaining state, and thereby preventing defective assembly of the cartridge memory.

According to another aspect of the present invention, there is provided a method of assembling a cartridge memory with a magnetic tape cartridge, wherein a plate-like cartridge memory is positioned on a lower half of a cartridge case with its one side lowered and is obliquely supported with respect to a bottom plate of the lower half, comprising the steps of:

positioning the cartridge memory to a predetermined position on the lower half; and placing a weight member on the cartridge memory.

Also, there is provided a structure of assembling a plate-like cartridge memory with a magnetic tape cartridge, comprising:

a cartridge case consisting of a lower half and an upper half;

a memory retaining portion formed on a bottom plate of the lower half and retaining the cartridge memory in such a manner that the cartridge memory is positioned on the memory retaining portion with its one side lowered and is obliquely supported with respect to the bottom plate; and a weight member placed on the cartridge memory.

By placing the weight member on the cartridge memory, it is possible to prevent rising of the cartridge memory. The weight member is preferably made from nonmetal with greater specific gravity such as rubber or ceramic, so as not to deteriorate the performance of the cartridge memory. Furthermore, the weight member is not necessary to be a thin plate-shaped like the cartridge memory. For example, a positioning rib for positioning the one side of the cartridge memory may be formed on the bottom plate of the lower half along the one lower side of the cartridge memory, and the weight member is preferably in the form of a wedge positioned between an upper surface of the cartridge memory that is obliquely supported and the positioning rib. With such a constitution, the weight member not only functions as a weight but also mechanically prevents rising of the cartridge memory with the weight member positioned between the positioning rib and the cartridge memory.

Therefore, even if the conveyor carries the cartridge memory as an assembly of the cartridge memory and the lower half, rising of the cartridge memory will be prevented. This prevents defective assembly of the cartridge memory and improves the production efficiency.

Furthermore, the weight member may be adhered on the cartridge memory. Because of the weight of the weight member, it is possible to prevent rising of the cartridge memory. The weight member may be made from the same material as the aforementioned weight member. Also, likewise the aforementioned constitution, a positioning rib for positioning the one side of the cartridge memory may be formed on the bottom plate of the lower half along the one lower side of the cartridge memory, and the weight member is preferably in the form of a wedge positioned between an upper surface of the cartridge memory that is obliquely supported and the positioning rib. As mentioned above, if the weight member is previously adhered on the cartridge memory, the operator does not have to assemble the weight member separately during the assembling operation, thereby leading to improved working efficiency.

Furthermore, even if the conveyor carries the cartridge memory as an assembly of the cartridge memory and the lower half, rising of the cartridge memory will be prevented. This prevents defective assembly of the cartridge memory and improves the production efficiency.

According to still another aspect of the present invention, there is provided a press jig for use in adhesion of a plate-like cartridge memory onto a memory retaining portion provided on a bottom plate of a lower half of a magnetic tape cartridge such that the cartridge memory is obliquely retained with respect to the bottom plate of the lower half at an predetermined inclination angle, the press jig pressing the cartridge memory in a direction toward the bottom plate during the adhesion of the cartridge memory onto the memory retaining portion with glue, comprising:

a pressing portion for pressing an upper surface of the cartridge memory that is placed on the memory retaining portion; and a displacement-restriction portion contacting with a lower end of the cartridge memory when the pressing portion presses the cartridge memory, so as to prevent the cartridge memory from displacing downwardly.

With such a constitution of the press jig, since the press jig comprises a displacement-restriction portion contacting with the lower end of the cartridge memory and preventing a downward displacement of the cartridge memory, in addition to a pressing portion for pressing one surface of the cartridge memory that is retained obliquely with respect to the lower half, when the press jig presses the cartridge memory, which is placed on the memory retaining portion and is to be adhered thereto, at first, the displacement-restriction portion restricts the lower end of the non-contacting type memory element and prevents a downward displacement of the cartridge memory. The pressing portion then presses the cartridge memory against the retaining rib, which retains a surface of the cartridge memory. For this reason, the lower end of the cartridge memory is positioned by the displacement-restriction portion, and the cartridge memory is adhered accurately at a predetermined assembling position.

According to a further aspect of the present invention, there is provided a method of assembling a cartridge memory with a lower half, which forms a part of a cartridge case of a magnetic tape cartridge, the cartridge memory including a plate-like substrate, and an IC chip placed on a flat portion of the substrate and forming a ridge portion, and the cartridge memory being sucked and picked up while assembling with respect to the lower half, the method comprising the steps of:

supplying the cartridge memory with its ridge portion faced upward; and sucking the cartridge memory at the flat portion.

With such an assembling method, since the cartridge memory is sucked at the flat portion, it is possible to prevent defective pick-up or suction of the cartridge memory due to a gap caused between the cartridge memory suction means and the cartridge memory. Furthermore, it is possible to prevent contacts of the suction means and the reel. Therefore, defective assembly of the cartridge memory is prevented.

As an assembling device which accomplishes the aforementioned assembling method, there is provided an assembling device comprising:

a suction means for sucking a cartridge memory, the cartridge memory including a plate-like substrate on which an IC chip is placed to form a ridge portion and a flat portion, and the cartridge memory being picked up with its flat portion sucked by the suction means; and a sucking tube of the suction means in the form of a long thin tube such that when the cartridge memory is obliquely assembled with a lower half, which forms a part of a cartridge case of a magnetic tape cartridge, the sucking tube does not contact with a reel around which a magnetic tape is wound.

With such an assembling device, since the sucking means sucks and picks up the cartridge memory at its flat portion, defective pick-up or suction of the cartridge memory is prevented between the sucking means and the flat portion of the cartridge memory, which ensures suction of the cartridge memory. Furthermore, since the sucking tube of the suction means is in the form of a long thin tube, even if the suction means tilts at the time of obliquely assembling the cartridge memory with the lower half of the cartridge case, it is possible to prevent contacts between the sucking tube and the reel.

According to the present invention, the terms "upper half" and "lower half" are nothing to do with the upper and the lower positions regarding the state of use of the magnetic tape cartridge. The terms merely distinguish the upper and the lower positions during the assembly of the magnetic tape cartridge.

BRIEF DESCRIPTION OF THE DRAWINGS

Preferred embodiments of the present invention will be described below, by way of example only, with reference to the accompanying drawings, in which:

FIG. 3A shows a state before assembly, FIG. 3B shows a state during the assembly, and FIG. 3C shows a state after completing the assembly;

FIG. 10A shows a state where the press jig is being lowered, and FIG. 10B shows a state where the cartridge memory is being pressed against the retaining slanted surface;

DESCRIPTION OF THE PREFERRED EMBODIMENTS

With reference to the attached drawings, preferred embodiments of the present invention will be described.

First Embodiment

Figure 1:
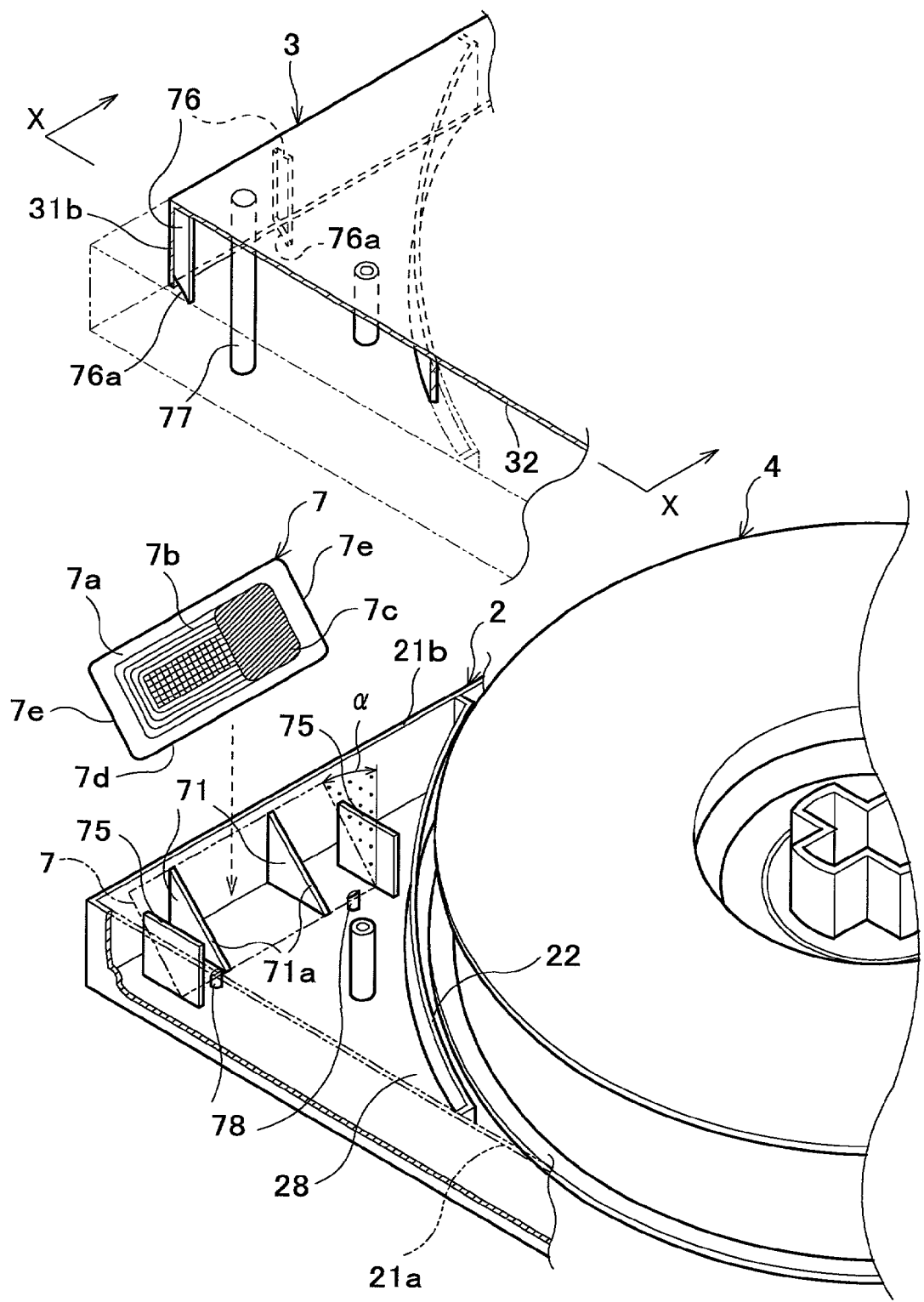
FIG. 1 is an enlarged exploded perspective view of a magnetic tape cartridge according to a first embodiment of the invention, partly illustrating structure where a cartridge memory is assembled.
Figure 2:
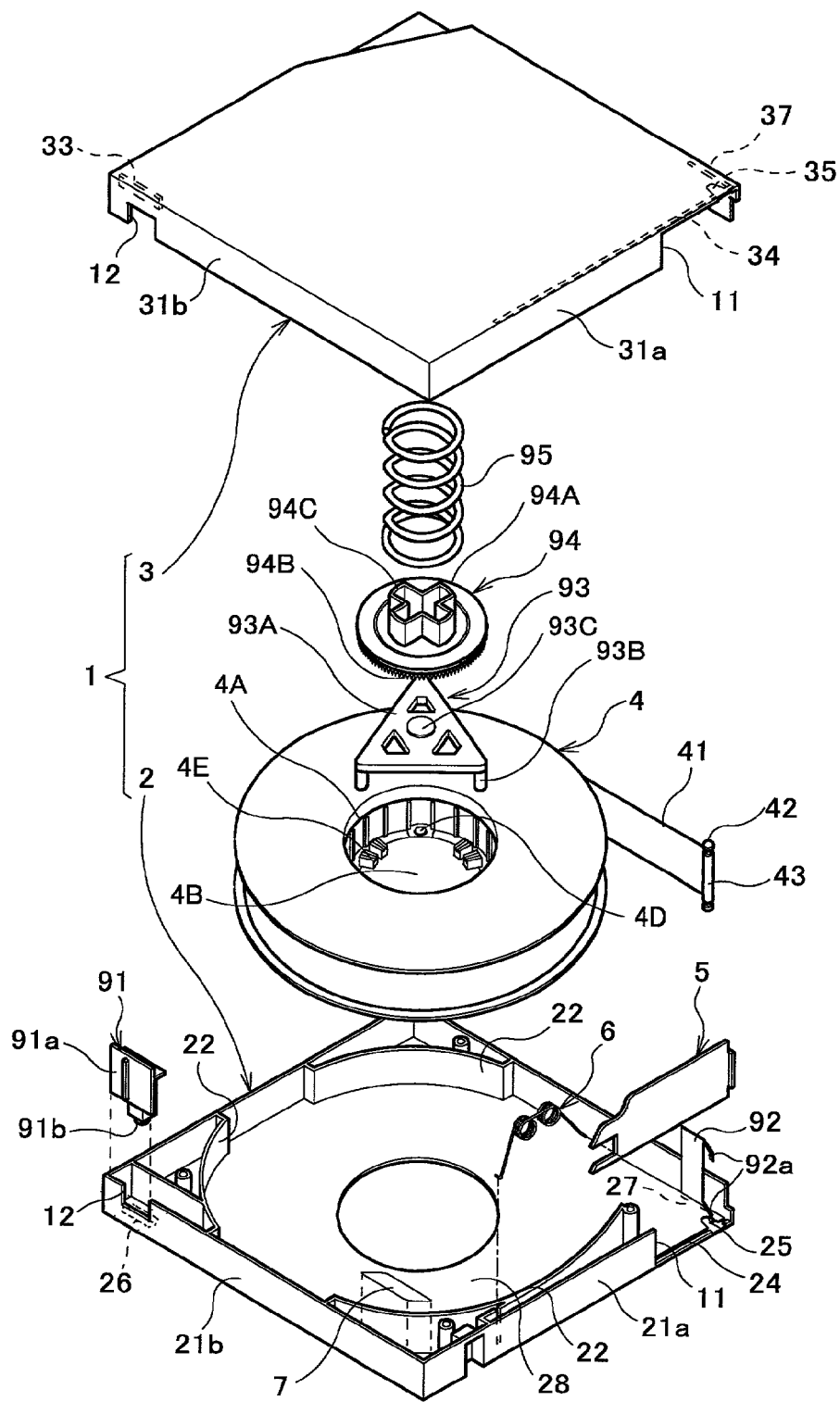
FIG. 2 is an exploded perspective view illustrating one example of a magnetic tape cartridge which satisfies LTO standard.

A first embodiment of the present invention will be described with reference to the drawings. As the drawings to be referred herein, FIG. 1 is an enlarged exploded perspective view of a magnetic tape cartridge, partly illustrating structure where a cartridge memory is assembled, and FIG. 2 is an exploded perspective view illustrating one example of a magnetic tape cartridge which satisfies LTO standard.

The whole structure of a magnetic tape cartridge, which satisfies LTO standard, will be described with reference to FIG. 2. As shown in FIG. 2, the magnetic tape cartridge includes a cartridge case 1 consisting of a lower half 2 and an upper half 3, and within the cartridge case 1, a reel 4 around which a magnetic tape 41 is wound, a slide door 5, a torsion coil spring 6, a cartridge memory 7, a safety lug 91, a thin plate spring 92, a release pad 93, a lock plate 94, and a compression coil spring 95 are accommodated.

At a corner of one side wall of the cartridge case 1, an opening 11 extends over the lower half 2 and the upper half 3 for pulling out the magnetic tape 41. The slide door 5 is slidable along a side wall 21a of the lower half 2 and a side wall 31a of the upper half 3 so as to open and close the opening 11. The coil spring 6 has two coil portions and always urges the slide door 5 in the closing direction.

The lower half 2 and the upper half 3 form respective halves of the cartridge case 1, and the cartridge case 1 is made when these two halves 2, 3 are assembled. Reinforcement ribs 22 are arranged on the lower half 2 at predetermined positions so that the periphery of the reel 4 is surrounded by the reinforcement ribs 22. In order to ensure a smooth sliding movement of the slider door 5, a shallow guide groove 24 is formed in a bottom plate 28 of the lower half 2 along the side wall 21a. Further, an operating window 12 for operating the safety lug 91 extends over side walls 21b, 31b that are positioned at the left-hand side of FIG. 2.

Although not shown in the drawings, the interior of the upper half 3 is formed substantially symmetrical with that of the lower half 2. Provided inwardly of the opening 11 and along the side wall 31a of the upper half 3 is a guide groove 34 for guiding the upper end of the slide door 5.

As shown in FIG. 2, the cartridge memory 7 is positioned in a space surrounded by the side walls 21a, 21b and the reinforcement rib 22 of the lower half 2 and retained obliquely at 45 degrees with respect to the bottom plate 28.

The safety lug 91 mainly comprises a plate-shaped front surface portion 91a facing to the operating window 12. A guide projection 91b with a tubular front end extending toward the lower half 2 is integral with the reverse side of the front surface portion 91a. An oblong guide hole 26 for receiving the guide projection 91b is formed in the bottom plate 28 of the lower half 2 along the side wall 21b, so that when the guide projection 91b is fitted into the guide hole 26, the safety lug 91 is slidable along the side wall 21b.

Further, in a position of the upper half 3 where the safety lug 91 is arranged, there is provided a guide rib 33 along the reverse surface of the front surface portion 91a. The safety lug 91 is slidably guided at its upper portion along the guide rib 33.

A leader pin 42 is fixed to the front end of the magnetic tape 41 with the clip 43. The leader pin 42 is engagable with a recording/playback device to pull out the magnetic tape 41.

Provided in the bottom plate 28 of the lower half 2 and adjacent to the opening 11 is a U-shaped engaging recess 25 that extends toward the opening 11. Likewise the lower half 2, the upper half 3 is also provided with an engaging recess 35. The engaging recesses 25, 35 function to store the leader pin 42 when the leader pin 42 retracts in the cartridge case 1. The leader pin 42 retracts from the open end of the engaging recesses 25, 35, and is stored within U-shaped semi-cylindrical portions at the innermost end of the engaging recesses 25, 35. A V-shaped pressing member 92a of the thin plate spring 92 extends laterally from the engaging recesses 25, 35. The shape of the pressing member 92a is determined such that upon pulling out the leader pin 42 from the cartridge case 1, the pressing member 92a is being interlocked with the leader pin 42. Since the pressing member 92a deforms when interlocking with and disengaging from the leader pin 42, the leader pin 42 is held at a predetermined load.

The thin plate spring 92 is fitted in narrow positioning grooves 27, 37 formed in the inner surfaces of the lower half 2 and the upper half 3, respectively.

The lock plate 94 has a disk-shaped plate body 94A to be accommodated in a cup-shaped hub 4A of the reel 4. AT the lower periphery of the lock plate 94, there is provided a toothed engaging surface 94B having radially extending bladed projections with a triangular section. The toothed engaging surface 94B is engagable with corresponding engaging surfaces 4E projecting from the bottom plate 4B of the cup-shaped hub 4A. Further, at an upper center part of the plate body 94A, there is provided a crisscross engaging recess portion 94C, into which non-shown four engaging projections formed at an inner center of the upper half 3 are inserted. A compression coil spring 95 as a resilient member is fitted onto the engaging recess portion 94C and positions between the upper half 3 and the lock plate 94, so that the lock plate 94 is urged downward and the toothed engaging surface 94B thereof engages with the engaging surfaces 4E formed on the bottom plate 4B of the cup-shaped hub 4A.

The release pad 93 includes a pad body 93A substantially in the form of an equilateral triangular plate having arcuate corners and positioned between the bottom plate 4B of the cup-shaped hub 4A and the lock plate 94. Three pillar-shaped lock releasing pins 93B (only two lock releasing pins are shown) project from the corners of the release pad 93 integrally with the respective arcuate corners. The lock releasing pins 93B are inserted into the three corresponding through-holes 4D (only one through-hole is shown) formed in the bottom plate 4B of the cup-shaped hub 4A. Further, a spherical projection 93C is formed at the center of the pad body 93A. The spherical projection 93C point-contacts with a non-shown spherical projection formed at a bottom center of the plate body 94A of the lock plate 94.

In the aforementioned constituent parts, elements such as the slide door 5, and the safety lug 91, are corresponding to the non-resilient constituent parts. When the slide door 5 and the safety lug 91 are assembled with the corresponding guide groove 34 and the guide rib 33, a slight interference often occurs due to positioning errors of the parts or the shape of the parts, thereby causing an impact.

A description will be given of the cartridge memory 7 and structure to which the cartridge memory 7 is assembled. As shown in FIG. 1, the cartridge memory 7 is an electric part in the shape of a thin rectangular plate. The cartridge memory 7 includes a non-shown IC chip as a main body that is sealed in a globe top 7c made from sealing resin. The IC chip is connected to a loop antenna 7b wired and printed on a substrate 7a.

At one corner of the lower half 2 surrounded by the side walls 21a, 21b and the reinforcement rib 22, a pair of retaining ribs 71 projects from the bottom plate 28 and extends perpendicularly to the bottom plate 28 and the side wall 21b. When viewing from the side, the retaining rib 71 is in the shape of a right-angled isosceles triangle having a right angle corner between the sides contacting with the side wall 21b and the bottom plate 28. A retaining slanted surface 71a of the retaining rib 71 tilts by 45 degrees with respect to the bottom plate 28, and functions as a memory retaining portion supporting the cartridge memory 7.

Two projections 78 are formed on the bottom plate 28, and engage with one lower side (hereinafter referred to as a lower side) 7d of the cartridge memory 7, so that the lower side 7d of the cartridge memory 7 is positioned by the retaining slanted surface 71a and the projections 78. As long as the cartridge memory 7 is obliquely retained by 45 degrees with respect to the bottom plate 28, the retaining ribs 71 is not limited to the ribs, and for example, a block-shaped retaining member may be employed. Furthermore, the projections 78 may be replaced with other elements, as long as the lower side 7d of the cartridge memory 7 is engaged. For example, the rib may be extended along the lower side 7d or a groove may be formed in the bottom plate 28.

Further, two restriction ribs 75 are formed on the bottom plate 28 parallelly to the retaining ribs 71. The restriction ribs 75 are spaced apart to each other for a distance substantially corresponding to the length of the lower side 7d of the cartridge memory 7. The restriction ribs 75 are slightly apart from the side wall 21b, and the height of each restriction rib 75 is substantially the same as that of the retaining rib 71. Further, the width of the restriction rib 75 is greater than the cartridge memory 7 when positioned on the retaining ribs 71, and extends inwardly toward the right-hand side of FIG. 1 beyond the lower side 7d of the cartridge memory 7. With such a constitution of the restriction ribs 75, when the cartridge memory 7 is guided in the space between the restriction ribs 75, the cartridge memory 7 is restricted at both ends 7e adjacent to the lower side 7d. The cartridge memory 7 is guided between the restriction ribs 75 so as to permit rising of the cartridge memory 7. In FIG. 1, the referential sign α indicates a cartridge memory-rising region where the cartridge memory rises.

A pair of memory supporting strips 76 is provided on the upper half 3 inwardly of the side wall 31b and parallelly to the retaining ribs 71 of the lower half 2. The pair of memory supporting strips 76 supports the upper surface of the cartridge memory 7 positioned on the retaining ribs 71. The lower end of each memory supporting strip 76 forms a supporting slanted surface 76a extending parallelly to the retaining slanted surface 71a such that when the lower half 2 and the upper half 3 are assembled together, the cartridge memory 7 is sandwiched between the retaining ribs 71 and the memory supporting strips 76.

Furthermore, a cylindrical stopper rod 77 projects from the inner surface of the top plate 32 of the upper half 3 such that when the lower half 2 and the upper half 3 are assembled together, the stopper rod 77 positions slightly above the upper surface of the cartridge memory 7.

Figure 3A:
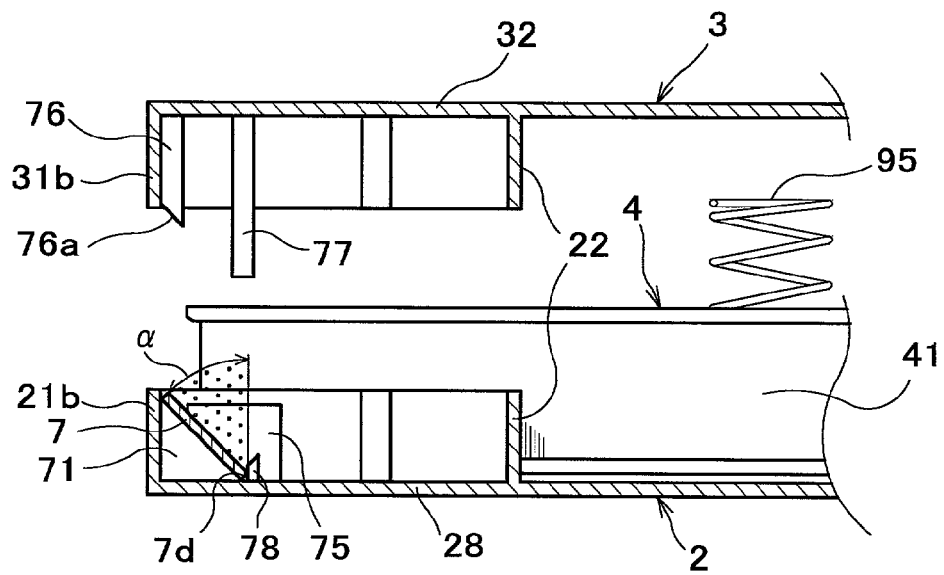
FIGS. 3A through 3C are sectional views illustrating an assembling sequence of the magnetic tape cartridge along the lines X—X of FIG. 1, wherein an upper half is assembled with a lower half. Herein.
Figure 3B:
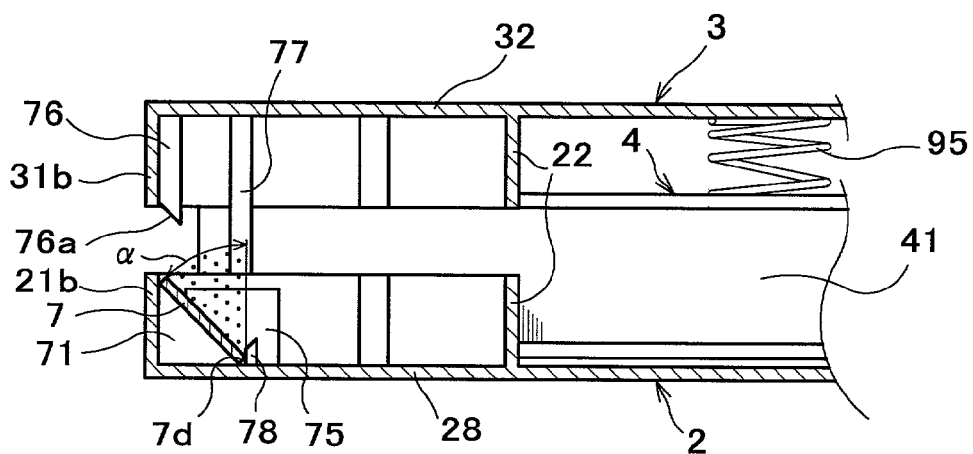
Figure 3C:
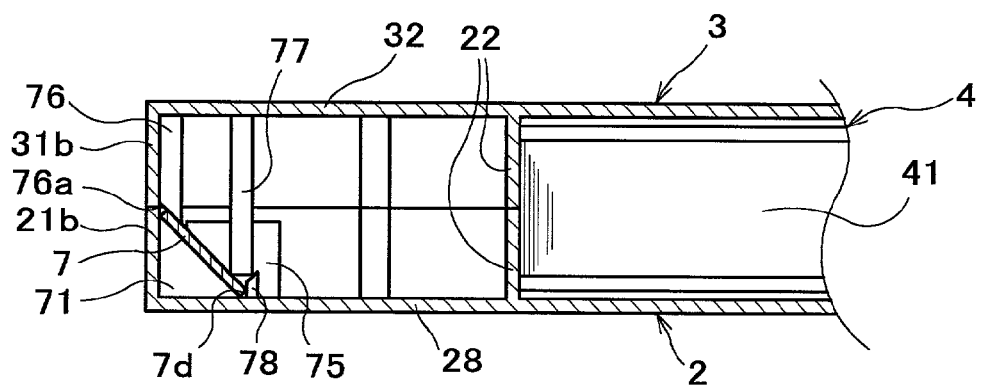

With reference to FIG. 3, operation of the cartridge case 1 will be described. FIGS. 3A through 3C are sectional views illustrating an assembling sequence of the magnetic tape cartridge along the lines X—X of FIG. 1, wherein an upper half is assembled with a lower half. Herein, FIG. 3A shows a state before assembly, FIG. 3B shows a state during the assembly, and FIG. 3C shows a state after completing the assembly.

The stopper rod 77 corresponds to the stopper member defined in the claims. The stopper rod 77 prevents the cartridge memory 7 from rising within the cartridge memory-rising region even if respective parts interfere with each other and an impact arises when the lower half 2 and the upper half 3 are assembled. The stopper rod 77 functions to lay down the cartridge memory 7 to a predetermined retaining position until the upper half 3 is completely assembled with the lower half 2.

As shown in FIG. 3A, before the upper half 3 is assembled with the lower half 2, onto which various constituent parts have been set, the upper half 3 does not contact with the constituent parts.

As shown in FIG. 3B, when the upper half 3 is gradually lowered toward the lower half 2, the compression coil spring 95 contacts with the upper plate 32 of the upper half 3. However, since the compression coil spring 95 is made from a resilient material, no impact will arise by this contact.

Subsequently, the stopper rod 77 gradually lowers toward the lower side 7d of the cartridge memory 7, and the front end of the stopper rod 77 reaches the cartridge memory-rising region α. When the upper half 3 lowers further, various non-resilient constituent parts shown in FIG. 2, such as the safety lug 91, and the slide door 5, are assembled with the corresponding supporting members formed on or in the upper half 3, such as the guide rib 33, and the guide groove 34. In this instance, an impact may be caused due to contact of the constituent parts.

If an impact arises due to interference of the non-resilient parts, the cartridge memory 7 would rise within the cartridge memory-rising region α. However, since the stopper rod 77 reaches the cartridge memory-rising region α, even if the cartridge memory 7 rises, lowering the upper half 3 prevents the cartridge memory 7 from staying standing and lays the cartridge memory down to the original retaining position.

When the upper half 3 is completely assembled with the lower half 2, as shown in FIG. 3C, the front end of the stopper rod 77 positioned just above the lower side 7d of the cartridge memory 7, and the cartridge memory 7 is supported between the supporting slanted surfaces 76a of the pair of memory supporting strips 76 formed on the upper half 3 and the retaining ribs 71 formed on the lower half 2. The supporting slanted surfaces 76a sandwiches the cartridge memory 7 in cooperation with the retaining ribs 71.

According to the cartridge case 1 furnished with the stopper rod 77, since the stopper rod 77 reaches the cartridge memory-rising region a to prevent rising of the cartridge 7 before various non-resilient constituent parts of the magnetic tape cartridge contact with corresponding supporting members of the upper half 3, defective assembly of the cartridge memory 7 is prevented.

While the first embodiment of the invention has been described in detail, the present invention is not limited to this specific embodiment.

Figure 4:
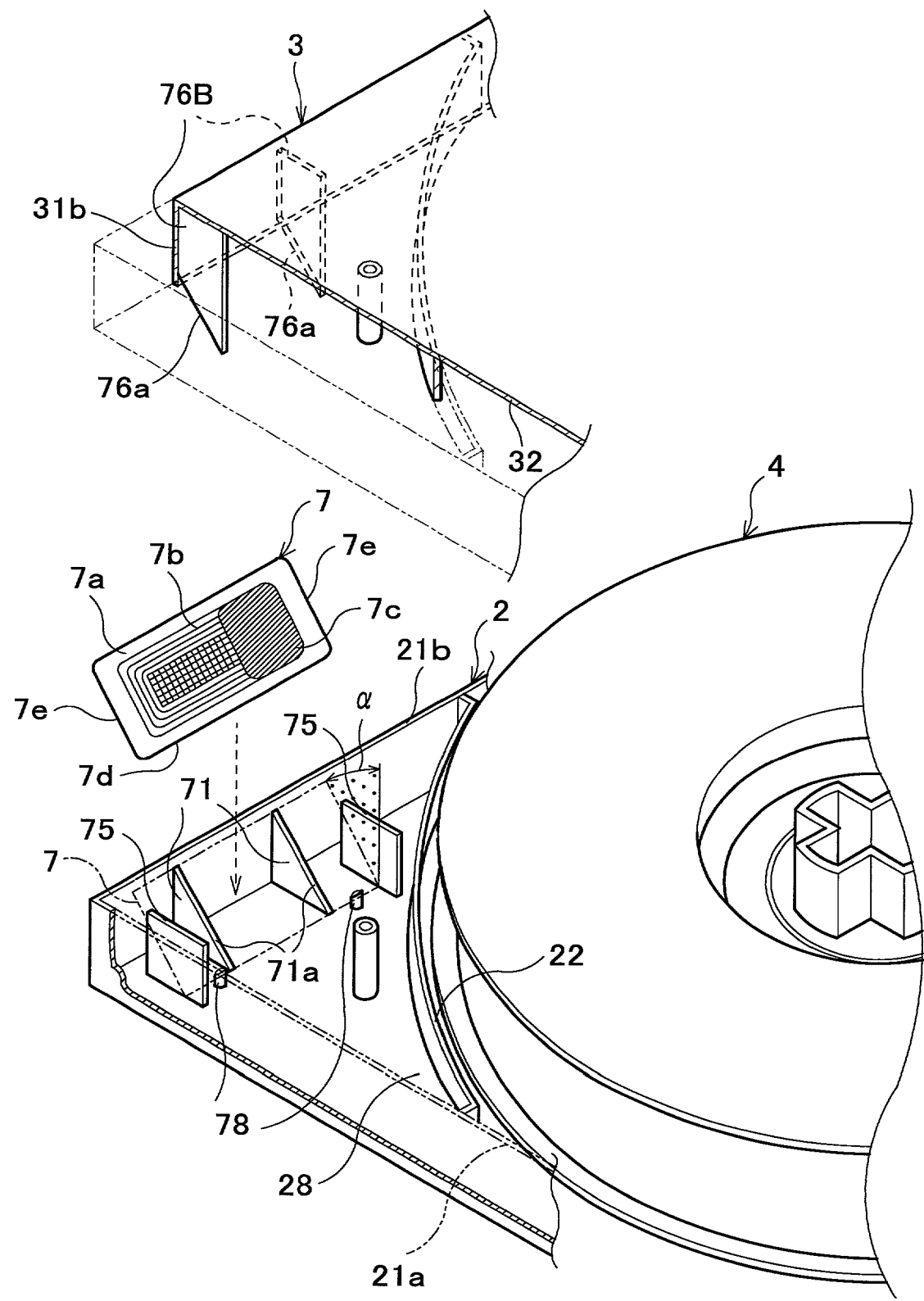
FIG. 4 is an enlarged exploded perspective view partly illustrating a modification of the cartridge case according to the first embodiment.

For example, in the first embodiment, the memory supporting strips 76 and the stopper rod 77 are formed as separate parts. However, as shown in FIG. 4, the memory supporting strips 76 and the stopper rod 77 may be formed as an integral member such that the supporting slanted surfaces 76a of the memory supporting strips 76 extend to the vicinity of the lower side 7d of the cartridge memory 7 in a state where the lower half 2 and the upper half 3 are assembled together. With such a constitution, the memory supporting strips 76B reach the cartridge memory-rising region α to prevent rising of the cartridge memory 7 before various constituent parts contact with corresponding supporting members of the upper half 3. In this instance, the memory supporting strips 76B corresponds to the stopper member defined in the claims.

Furthermore, it is not necessary that the stopper rod 77 is integral with the upper half 3. The stopper rod 77 may be formed by adhering or assembling a previously molded element with respect to the upper half 3.

Second Embodiment

Figure 5:
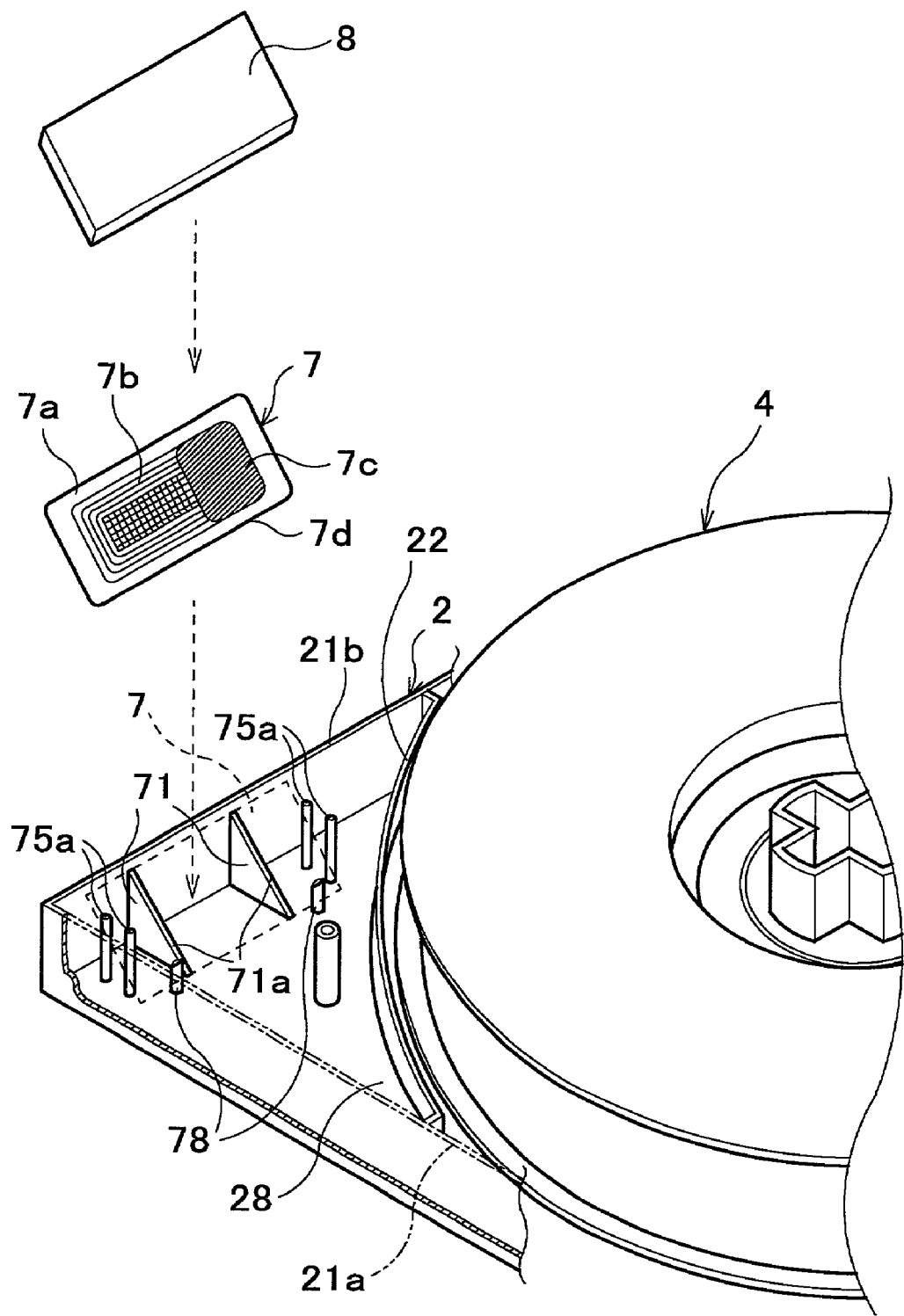
FIG. 5 is an enlarged exploded perspective view partly illustrating a lower half, a cartridge memory, and a weight member of a cartridge case according to a second embodiment of the invention.

A second embodiment of the present invention will be described with reference to the drawings. As the drawings to be referred herein, FIG. 5 is an enlarged exploded perspective view partly illustrating a lower half, a cartridge memory, and a weight member of a cartridge case according to a second embodiment of the invention. Since the overall construction of the magnetic tape cartridge is substantially the same as that of the first embodiment, parts similar to those previously described with respect to the first embodiment are denoted by the same reference numerals and detailed description thereof will be omitted.

In the magnetic tape cartridge shown in FIG. 5, two projections 78 engagable with the lower side 7d of the cartridge memory 7 are formed on the bottom plate 28, and the lower side 7d of the cartridge memory 7 is positioned by the retaining slanted surface 71a and the projections 78. Further, in order to prevent the cartridge memory 7 from sliding along its lower side 7d, two pairs of rod-like restriction pins 75a project from the bottom plate 28 of the lower half 2 for restricting both ends of the cartridge memory 7. As long as the cartridge memory 7 is obliquely retained by 45 degrees with respect to the bottom plate 28, the retaining ribs 71 is not limited to the ribs, and for example, a block-shaped retaining member may be employed. Furthermore, the projections 78 may be replaced with other elements, as long as the lower side 7d of the cartridge memory 7 is engagable. For example, the rib may be extended along the lower side 7d or a groove may be formed in the bottom plate 28.

A weight member 8 is positioned on the upper surface of the cartridge memory 7. The weight member 8 is substantially the same as the cartridge memory 7 in size and thickness. In order to prevent adverse affect for the performance of the cartridge memory 7, the weight member 8 is made from nonmetal. Further, in order to satisfy the function as a weight, the weight member 8 is preferably made from a material with greater specific gravity, such as rubber and ceramic to be cut for a predetermined shape.

Figure 6:
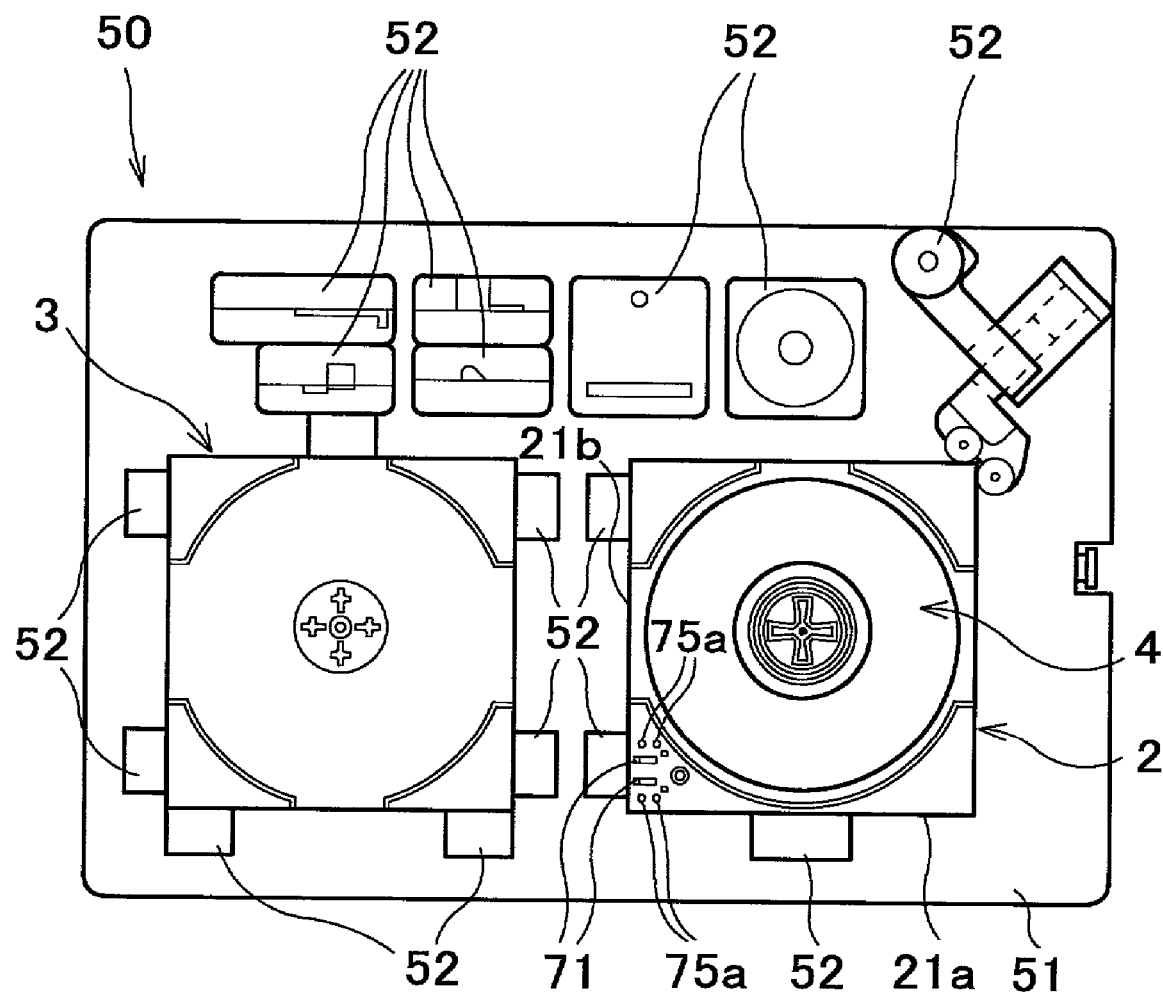
FIG. 6 is a plan view illustrating a transferring pallet.
Figure 6:

With reference to FIG. 6, a transferring pallet for carrying constituent parts of the magnetic tape cartridge on an assembly line will be described. In FIG. 6, the transferring pallet 50 is carried in the right-hand direction.

In the assembly line of the magnetic tape cartridge, each constituent part is set in a predetermined position on the transferring pallet 50 shown in FIG. 6 so that the constituent parts are smoothly supplied to the robot or the assembling machine. The transferring pallet 50 comprises a base plate 51, and parts-retaining jigs 52 fixed to the base plate 51 and retaining the respective constituent parts. Although not shown, parts such as the safety lugs 8 and the slide door 5 are set in the parts-retaining jigs 52. In consideration of readiness of the assembly by the robot or the assembling device, the lower half 2 is arranged with its side wall 21a positioned at the lower side of FIG. 6. Therefore, when the transferring pallet 50 is stopped, an inertial force acts to raise the cartridge memory 7.

As mentioned above, various parts of the magnetic tape cartridge are positioned on the transferring pallet 50. The magnetic tape cartridge is assembled while the transferring pallet 50 is carried with transferring means such as a roller conveyor. When assembling the magnetic tape cartridge, the reel 4 and other parts are assembled with respect to the lower half 2, and at the same time, the cartridge memory 7 is positioned on the retaining slanted surfaces 71a of the retaining ribs 71 by hand or by the robot. The weight member 8 is thereafter placed on the cartridge memory 7 by hand or by the robot (FIG. 5).

As mentioned above, since the transferring pallet 50 is carried to the next operation with the weight member 8 placed on the cartridge memory 7, even at the moment in which the transferring pallet 50 is stopped at the operating position of the robot and the like, it is possible to prevent rising of the cartridge memory 7 due to the deceleration. Even if the cartridge member 7 rises, since the weight member 8 is placed on the cartridge memory 7, the cartridge member 7 is laid down to the original retaining position because of the weight of the weight member 8. This is advantageous because if the weight member 8 is not employed, the cartridge memory 7 may be trapped by some elements such as the retaining ribs 71, the projections 78, the restriction ribs 75, etc (FIG. 1), and stays standing. The cartridge memory 7 would rise because of vibration during the transfer. However, the weight member 8 lays down the cartridge memory 7 to the original retaining position.

When speeding up the line tact to improve the productivity, transferring speed of the transferring pallet 50 has to be increase, which leads to increment in acceleration for stop and vibration during the transfer. Therefore, the inertial force acting on the cartridge memory 7 becomes greater. However, according to this embodiment, since the weight member 8 prevents rising and defective retention of the cartridge memory 7, automation of the magnetic tape cartridge is readily achieved. Also, it is possible to improve quality and productivity of the magnetic tape.

Third Embodiment

Figure 7:
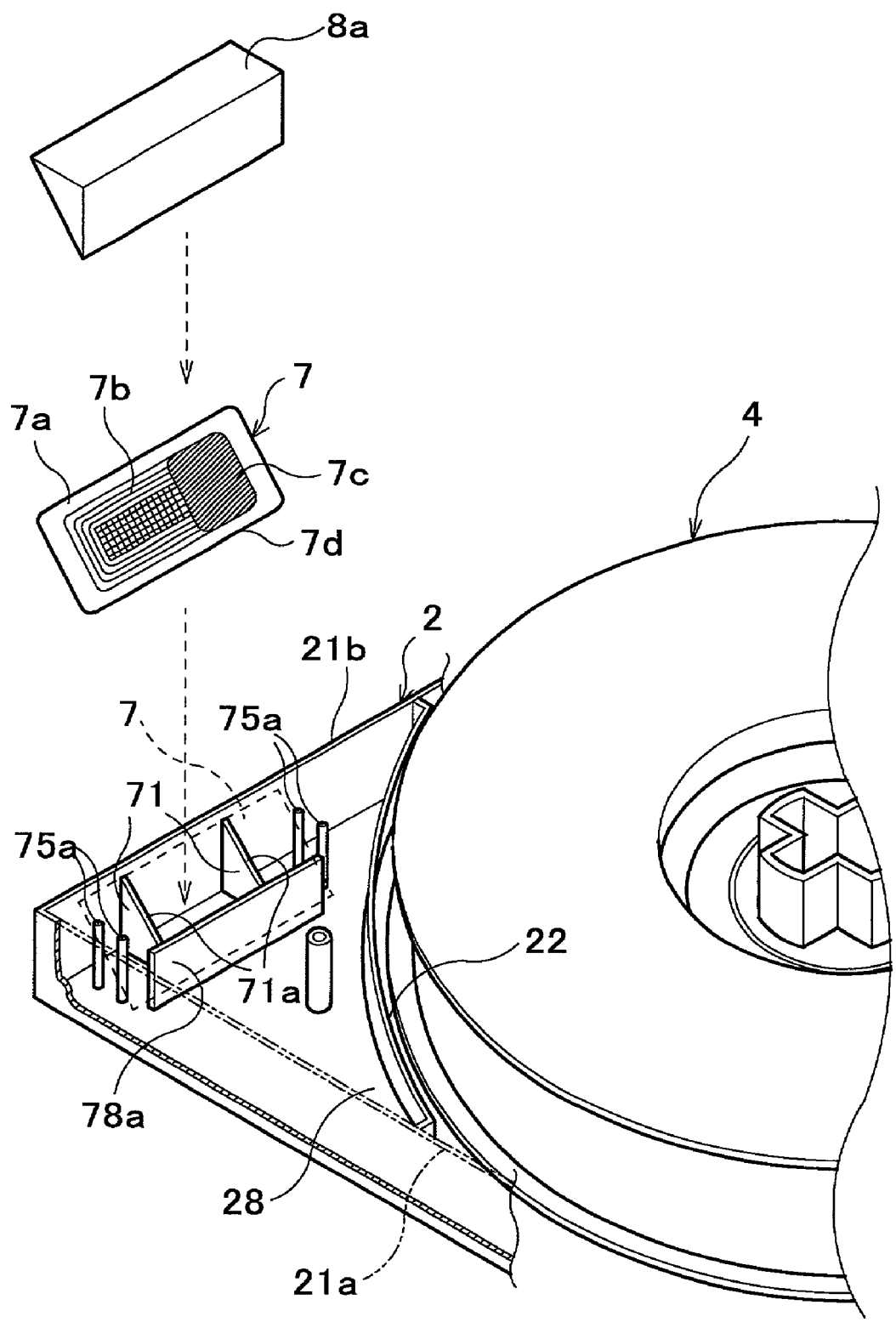
FIG. 7 is an enlarged exploded perspective view partly illustrating a lower half, a cartridge memory, and a weight member of a cartridge case according to a third embodiment of the invention.

A third embodiment of the present invention will be described. FIG. 7 is an enlarged exploded perspective view partly illustrating a lower half, a cartridge memory, and a weight member of a cartridge case according to a third embodiment of the invention. In this embodiment, parts similar to those previously described with respect to the first and the second embodiments are denoted by the same reference numerals and detailed description thereof will be omitted.

In this embodiment, modifications are shown with regard to the second embodiment, in which the weight member is modified and other members supporting the lower side 7d of the cartridge memory 7 is also modified in accordance with the modified weight member.

As shown in FIG. 7, the lower side 7d of the cartridge memory 7 is supported by an engaging rib 78a extending linearly along the line connecting the bottom ends of the pair of retaining slanted surfaces 71 a and having a predetermined length and a height substantially equal to the retaining ribs 71. The engaging rib 78a is formed perpendicularly to the bottom plate 28, and the angle made between the retaining slanted surface 71a and the engaging rib 78a is 45 degrees.

The weight member 8a is made from nonmetal such as rubber. The weight member 8a is in the shape of a pillar having a right-angled isosceles triangular cross-section. This wedge-like shape allows the weight member 8a to position between the retaining slanted surface 71 a and the engaging rib 78a.

When assembling the magnetic tape cartridge comprising these lower half 2 and weight member 8a, the reel 4 and other parts are assembled with respect to the lower half 2, and at the same time, the cartridge memory 7 is positioned on the retaining slanted surfaces 71 a of the retaining ribs 71 by hand or by the robot. The weight member 8a is thereafter placed on the cartridge memory 7 with its slanted surface faced to the upper surface of the cartridge memory 7 and with its 45 degree wedge portion conformed with the lower side 7d of the cartridge memory 7.

When the transferring pallet 50 is carried to the next operation, even at the moment in which the transferring pallet 50 is stopped at the operating position of the robot and the like, the inertial force acting on the weight member 8 a and the cartridge memory 7 is restricted at the engaging rib 78a. Therefore, the weight member 8a does not displace and the cartridge memory 7 is retained in a predetermined retaining position without rising of the cartridge memory 7. Further, since the weight member 8a is sandwiched between the retaining ribs 71 and the engaging rib 78a, the cartridge memory is retained in a predetermined retaining position even if vibration arises during the transfer.

Fourth Embodiment

Figure 8:
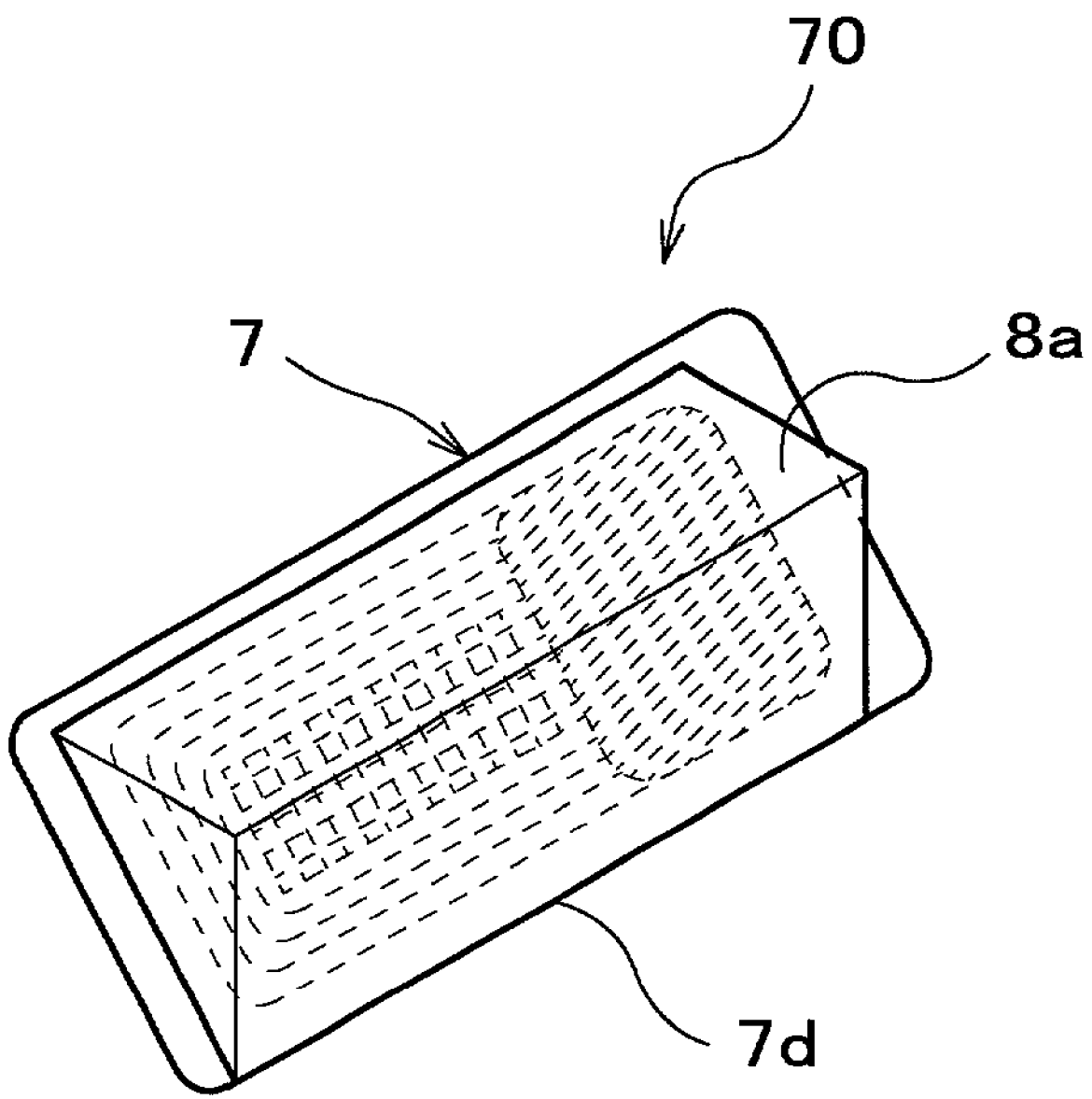
FIG. 8 is an enlarged perspective view illustrating a cartridge memory according to a fourth embodiment of the invention.

A fourth embodiment of the present invention will be described. FIG. 8 is an enlarged perspective view illustrating a cartridge memory according to a fourth embodiment of the invention. In this embodiment, parts similar to those previously described with respect to the fist to third embodiments are denoted by the same reference numerals and detailed description thereof will be omitted.

In the cartridge memory 70 shown in FIG. 8, the aforementioned weight member 8a is adhered to the cartridge memory 7 in such a manner that the slanted surface of the weight member 8a faces to the upper surface of the cartridge memory 7 and the wedge portion conforms with the lower side 7d of the weight member 8a. According to this cartridge memory 70, instead of positioning both the cartridge memory 7 and the weight member 8a on the lower half 2 in the assembly line, positioning is required only for the cartridge memory 70.

While the fourth embodiment of the invention has been described in detail, the present invention is not limited to this specific embodiment.

For example, the magnetic tape cartridge does not satisfy LTO standard. The present invention is applicable to any cartridge memory wherein a thin plate-like cartridge memory is obliquely retained.

The shape and the number of the weight member may vary, and granular weight members may be employed. Further, when fixing the weight member to the cartridge memory, the cartridge memory may be hooked to or wound around the weight member, other than adhesion. Alternatively, the cartridge memory may be wrapped integrally by a weight member such as resins.

Fifth Embodiment

Figure 9:
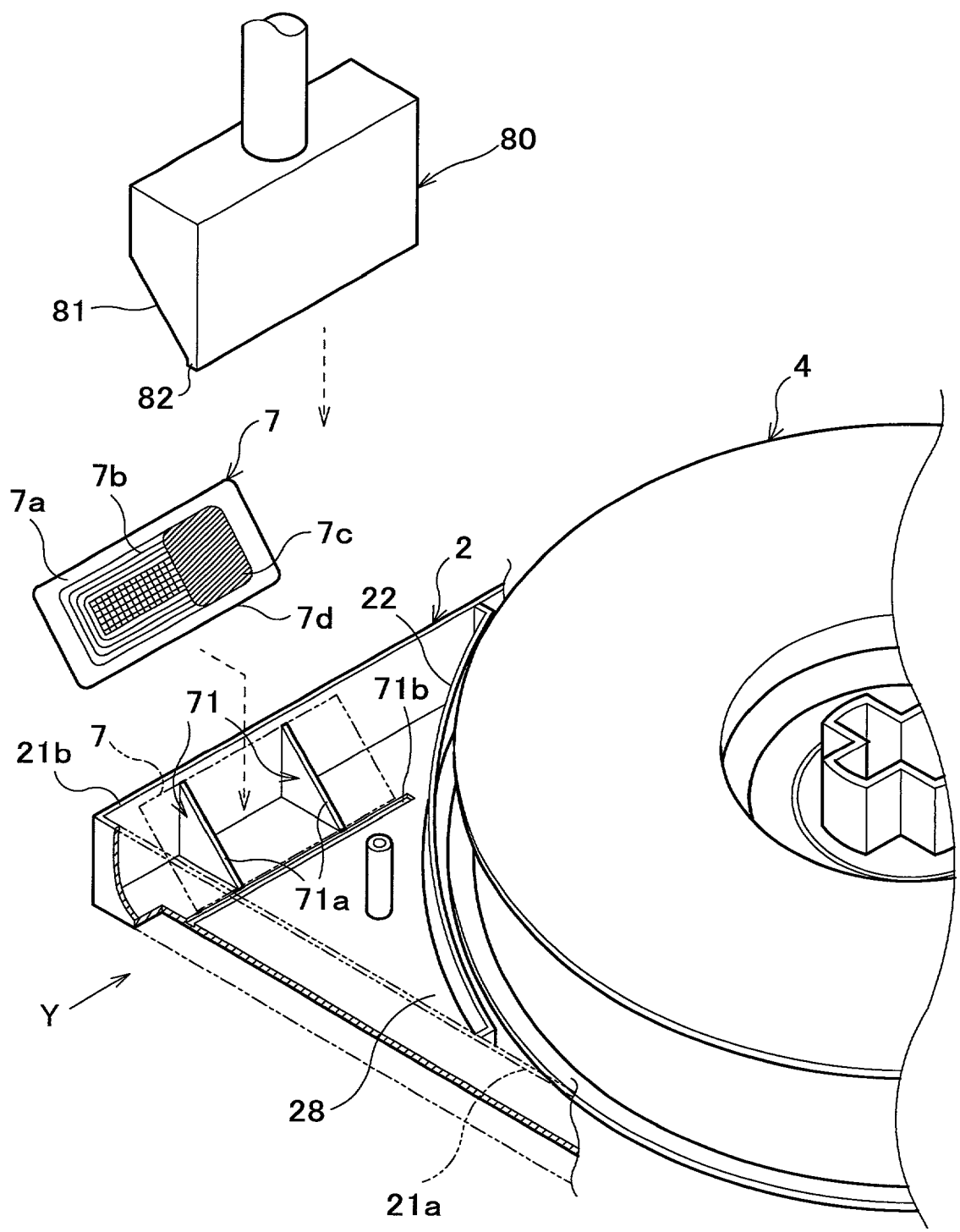
FIG. 9 is an enlarged exploded perspective view illustrating a part of a magnetic tape cartridge and a press jig according to a fifth embodiment of the invention.
Figure 10A:
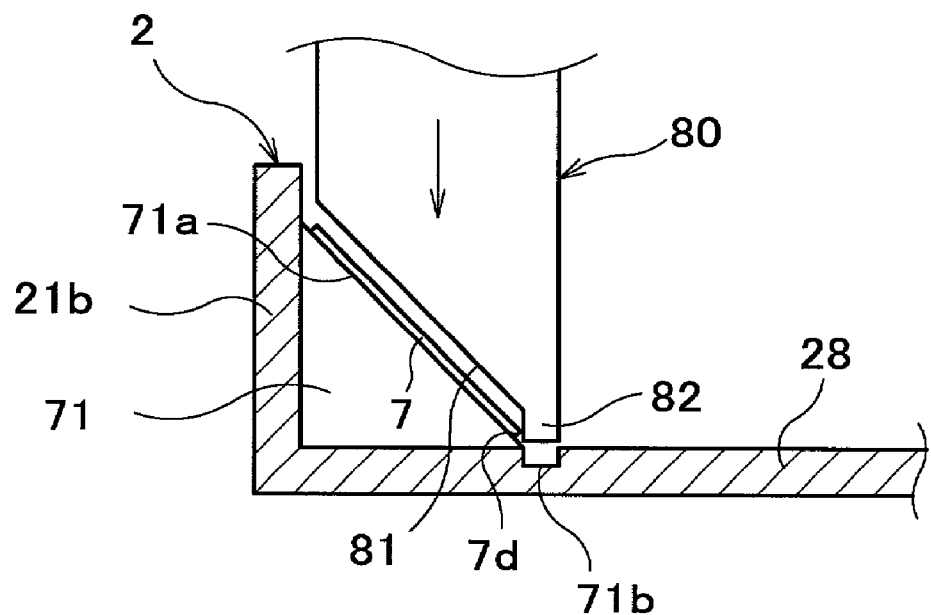
FIGS. 10A and 10B are views explaining a state of use of the press jig according to the fifth embodiment of the invention, viewing from the arrow Y of FIG. 9. Herein.
Figure 10B:
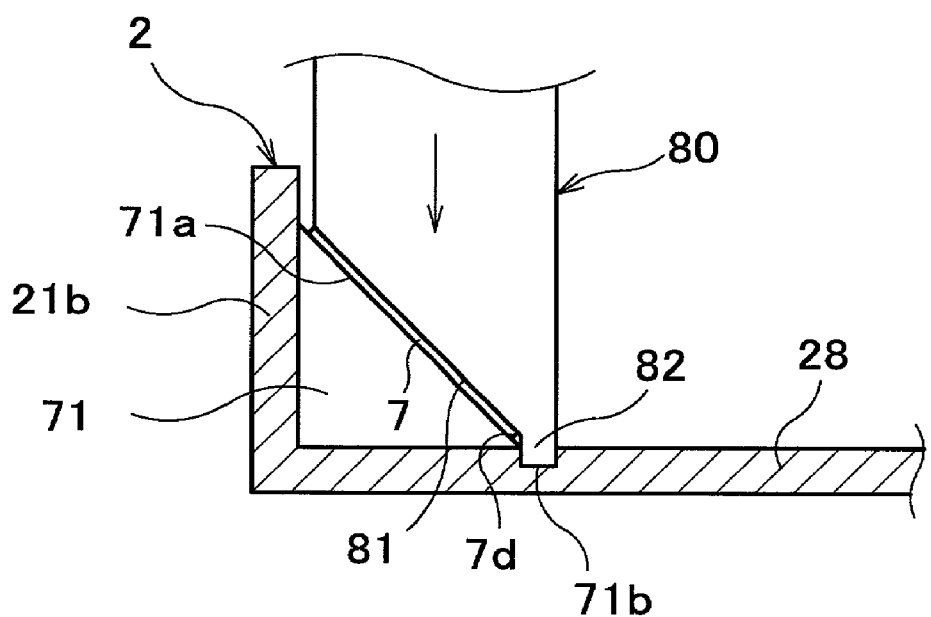

A fifth embodiment of the present invention will be described with reference to the accompanied drawings. As the drawings to be referred herein, FIG. 9 is an enlarged exploded perspective view illustrating a part of a magnetic tape cartridge and a press jig according to a fifth embodiment of the invention, and FIGS. 10A and 10B are views explaining a state of use of the press jig according to the fifth embodiment of the invention, viewing from the arrow Y of FIG. 9. Since the overall constitution of the magnetic tape cartridge is substantially the same as that of the first embodiment, parts similar to those previously described with respect to the first embodiment are denoted by the same reference numerals and detailed description thereof will be omitted.

As shown in FIG. 9, at one corner surrounded by the side walls 21a, 21b of the lower half 2 and the reinforcement rib 22, a pair of retaining ribs 71 projects from the bottom plate 28 and extends perpendicularly to the bottom plate 28 and the side wall 21b. When viewing from the side, the retaining rib 71 is in the shape of a right-angled isosceles triangle having a right angle corner between the sides contacting with the side wall 21b and the bottom plate 28. The retaining slanted surface 71a of the retaining rib 71 tilts by 45 degree with respect the bottom plate 28, and functions as a memory retaining portion supporting the cartridge memory 7. The retaining slanted surface 71 a corresponds to the memory retaining portion defined in the claims.

A groove 71b having a U-shaped section is formed in the bottom plate 28. The groove 71b extends in the direction connecting the bottom ends of the pair of retaining ribs 71, adjacent to the bottom ends of the two retaining ribs 71. The groove 71b functions as a clearance preventing a displacement-restriction rib 82 as a displacement-restriction portion of a press jig to be described later from interfering with the bottom plate 28.

The pressing jig 80 is provided at the front of the hand of the assembly assist device or the assembling robot positioned on the non-shown assembly line or assembling device. The pressing jig 80 mainly comprises a metal block, and the lower surface forms a pressing slanted surface 81 tilted by 45 degrees with respect to the bottom plate 28 so as to conform with the upper surface of the cartridge memory 7. The pressing slanted surface 81 corresponds to the pressing portion defined in the claims. Provided at the bottom end of the pressing slanted surface 81 is a linear-shaped displacement-restriction rib 82 facing to the bottom plate 28 and brought into engagement with the groove 71b.

The aforementioned pressing jig 80 is used as follows. At first, glue is applied to the retaining slanted surface 71a by hand or by the assembling device, and then the cartridge memory 7 is placed on the retaining slanted surfaces 71a and provisionally adhered thereto. Subsequently, as shown in FIG. 10A, the assembly assist device or the robot lowers the pressing jig 80 toward the bottom plate 28, so that the displacement-restriction rib 82 positions beside the lower side 7d of the cartridge memory 7. Therefore, the displacement-restriction rib 82 prevents the cartridge memory 7 from sliding along the retaining slanted surface 71a downwardly toward the bottom plate 7d.

The pressing jig 80 further moves toward the bottom plate 28, and as shown in FIG. 10B, the pressing slanted surface 81 presses the upper surface of the cartridge memory 7 at a predetermined pressure to press the cartridge memory 7 against the retaining slanted surface 71a. In this event, even if the cartridge memory 7 is pulled downwardly along the retaining slanted surfaces 71a due to friction caused between the upper surface of the cartridge memory 7 and the pressing slanted surface 81, because the lower side 7d of the cartridge memory 7 abuts against the displacement-restriction rib 82, the cartridge memory 7 does not slide down from the predetermined position and accurate positioning is performed. When the pressing jig 80 is elevated, the pressing operation of the cartridge memory 7 against the retaining slanted surface 71 a is completed.

Sixth Embodiment

Figure 11:
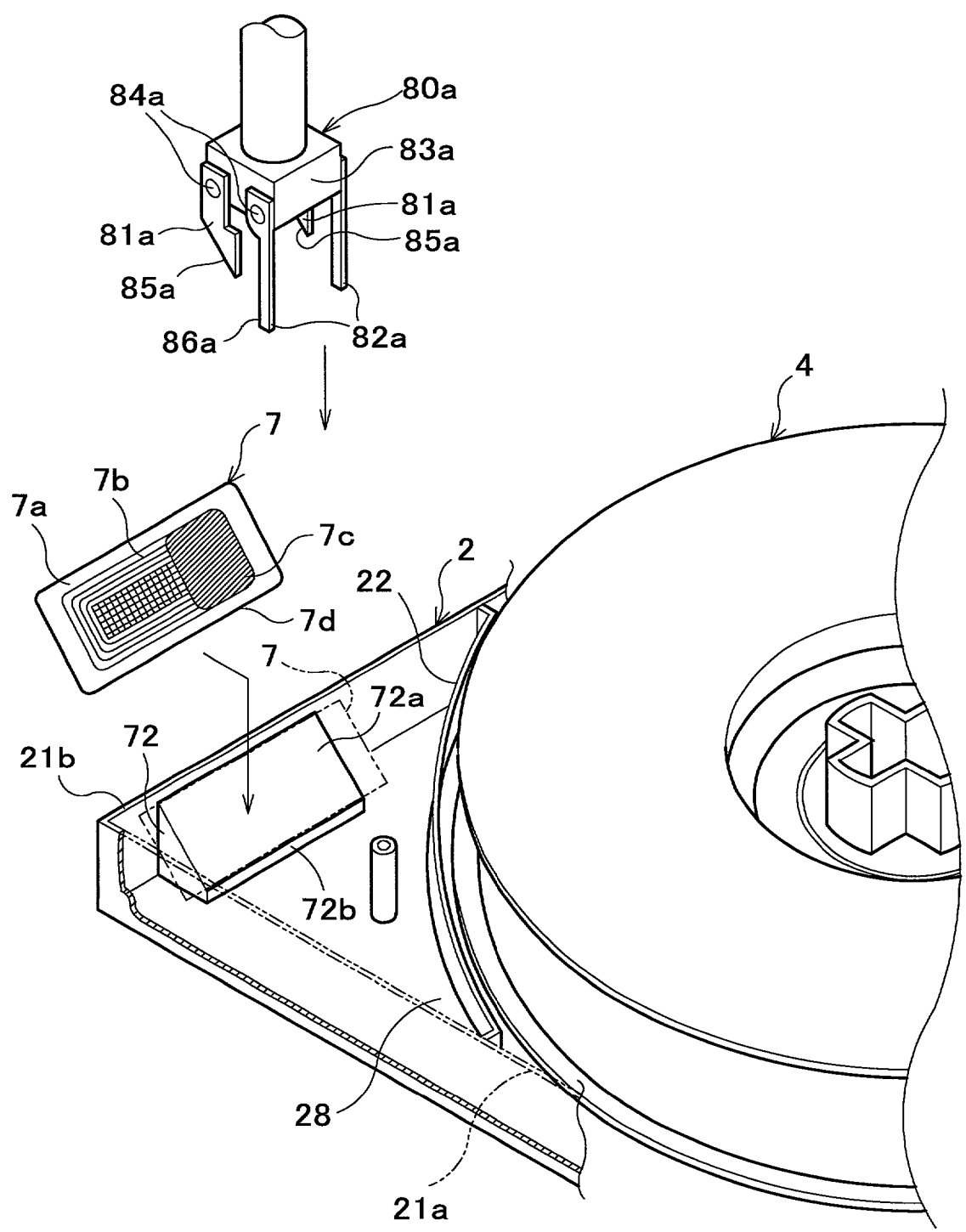
FIG. 11 is an enlarged exploded perspective view illustrating a part of a magnetic tape cartridge and a press jig according to a sixth embodiment of the invention.

A sixth embodiment of the present invention will be described. FIG. 11 is an enlarged exploded perspective view illustrating a part of a magnetic tape cartridge and a press jig according to a sixth embodiment of the invention. In this embodiment, parts similar to those previously described with respect to the first to the fifth embodiments are denoted by the same reference numerals and detailed description thereof will be omitted.

As shown in FIG. 11, at one corner surrounded by the side walls 21 a, 21b of the lower half 2 and the reinforcement rib 22, there is provided a retaining block 72 having a retaining slanted surface 72a tilted by 45 degrees with respect to the bottom pate 28. The retaining slanted surface 72a corresponds to the memory retaining portion defined in the claims.

The retaining block 72 forms at its lower end side of the slanted surface a side wall 72b standing perpendicularly to the bottom plate 28. The retaining slanted surface 72a is designed to have sufficient size so that when the cartridge memory 7 is placed on the retaining slanted surface 72a, the cartridge memory 7 does not protrude from the bottom end of the retaining slanted surface 72a.

The pressing jig 80a comprises a box-like metal block 83a, and at both ends of the block 83a, a pair of pressing strips 81a as a pressing portion that is formed by stamping a plate material, and a pair of displacement-restriction strip 82a as a displacement-restriction portion are fixed by bolts 84a.

When in use, pressing strips 81 a are parallel to the lengthwise direction of the retaining slanted surface 72a. The lower end of each pressing strip 81a forms a pressing slanted side 85a conforming with the retaining slanted surface 72a. The pair of displacement-restriction strips 82a are slightly spaced apart from the pressing strips 81a, and extend downwardly beyond the bottom of the pressing slanted sides 85a. The displacement-restriction strips 82a is fixed to the block 83a such that one side 86a adjacent to the pressing strips 81 a contact with the side wall 72b of the retaining block 72.

According to the aforementioned pressing jig 80 and the lower half 2, notwithstanding that the lower half 2 is not provided with a groove and the memory retaining portion is not formed as ribs, the cartridge memory 7, like the fifth embodiment, is positioned in a predetermined position.

In the assembling operation, glue is applied to the retaining slanted surface 72a by hand or by the assembling device, and then the cartridge memory 7 is placed on the retaining slanted surface 72a. Subsequently, the assembly assist device or the robot lowers the pressing jig 80a from above the cartridge memory 7 toward the bottom plate 28, so that one side 86a of the displacement-restriction strip 82a contacts with the side wall 72b of the retaining block 72. The pressing strips 81a then press the cartridge memory 7 at a predetermined load. As the result, the cartridge memory 7 is pressed against the retaining slanted surface 72a. In this instance, the cartridge memory 7 is liable to slide downwardly along the retaining slanted surface 72a. However, since the lower side 7d of the cartridge memory 7 abuts against one side 86a of the displacement-restriction strip 82a, further displacement of the cartridge memory 7 is restricted. When the pressing jig 80a is elevated, the pressing operation of the cartridge memory 7 is completed. Accordingly, the cartridge memory 7 does not displace downwardly from the predetermined assembling position, enabling accurate assembly of the cartridge memory 7.

Seventh Embodiment

A seventh embodiment of the present invention will be described with reference to the drawings.

Figure 12:
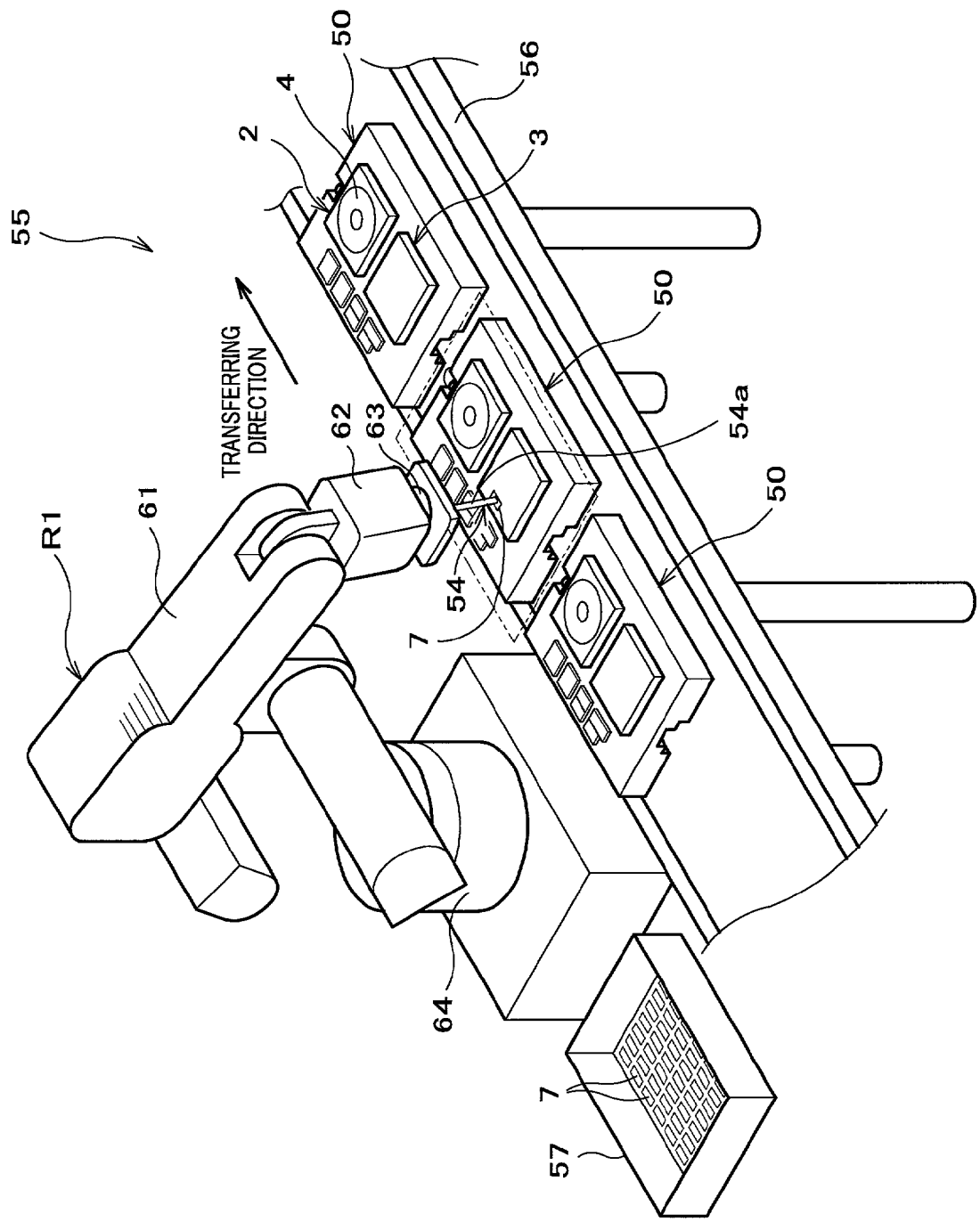
FIG. 12 is a perspective view illustrating a cartridge memory assembling device according to a seventh embodiment of the invention.
Figure 13:
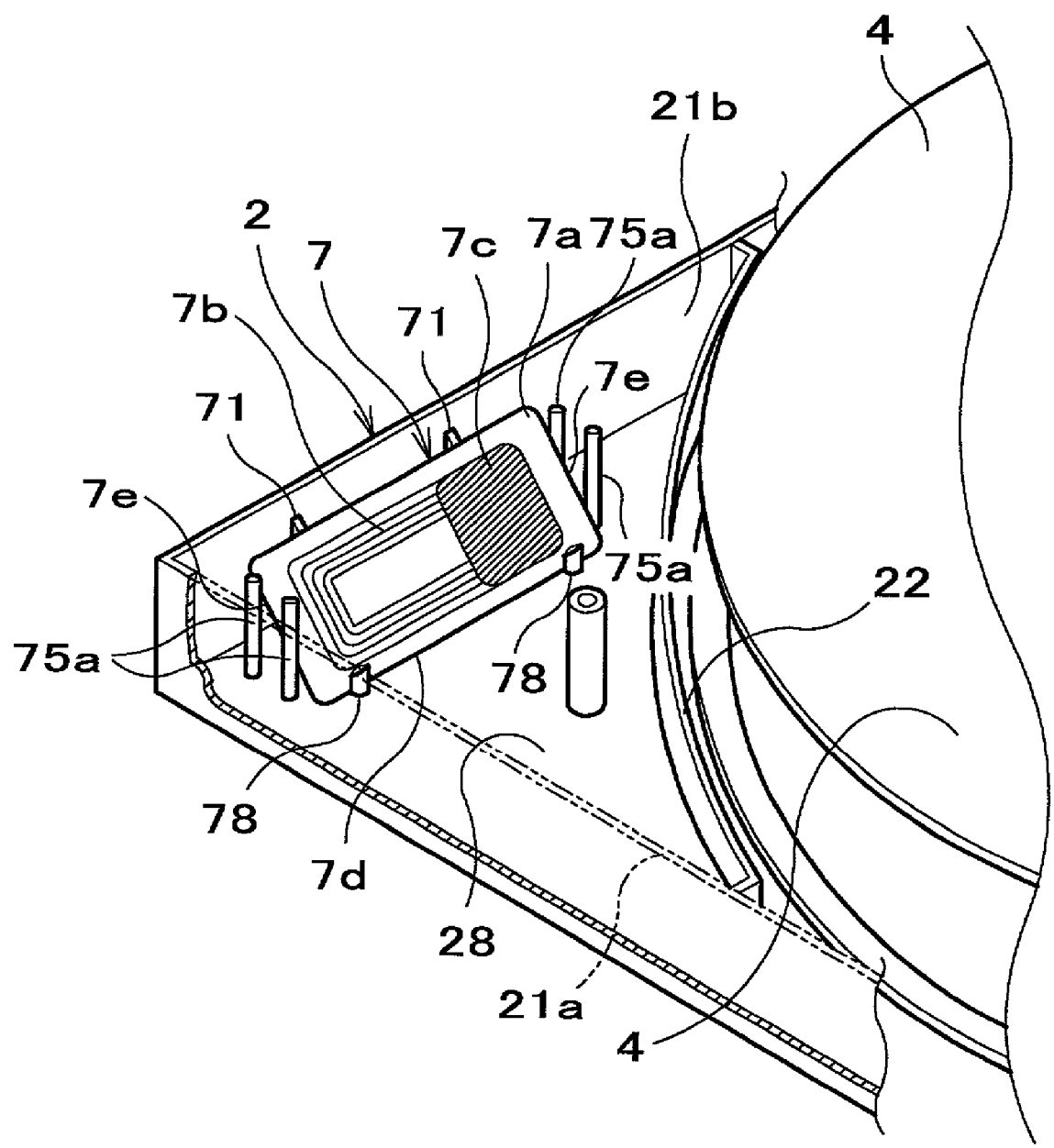
FIG. 13 is a perspective view according to the seventh embodiment, illustrating a state where a cartridge memory is assembled with a lower half.
Figure 14:
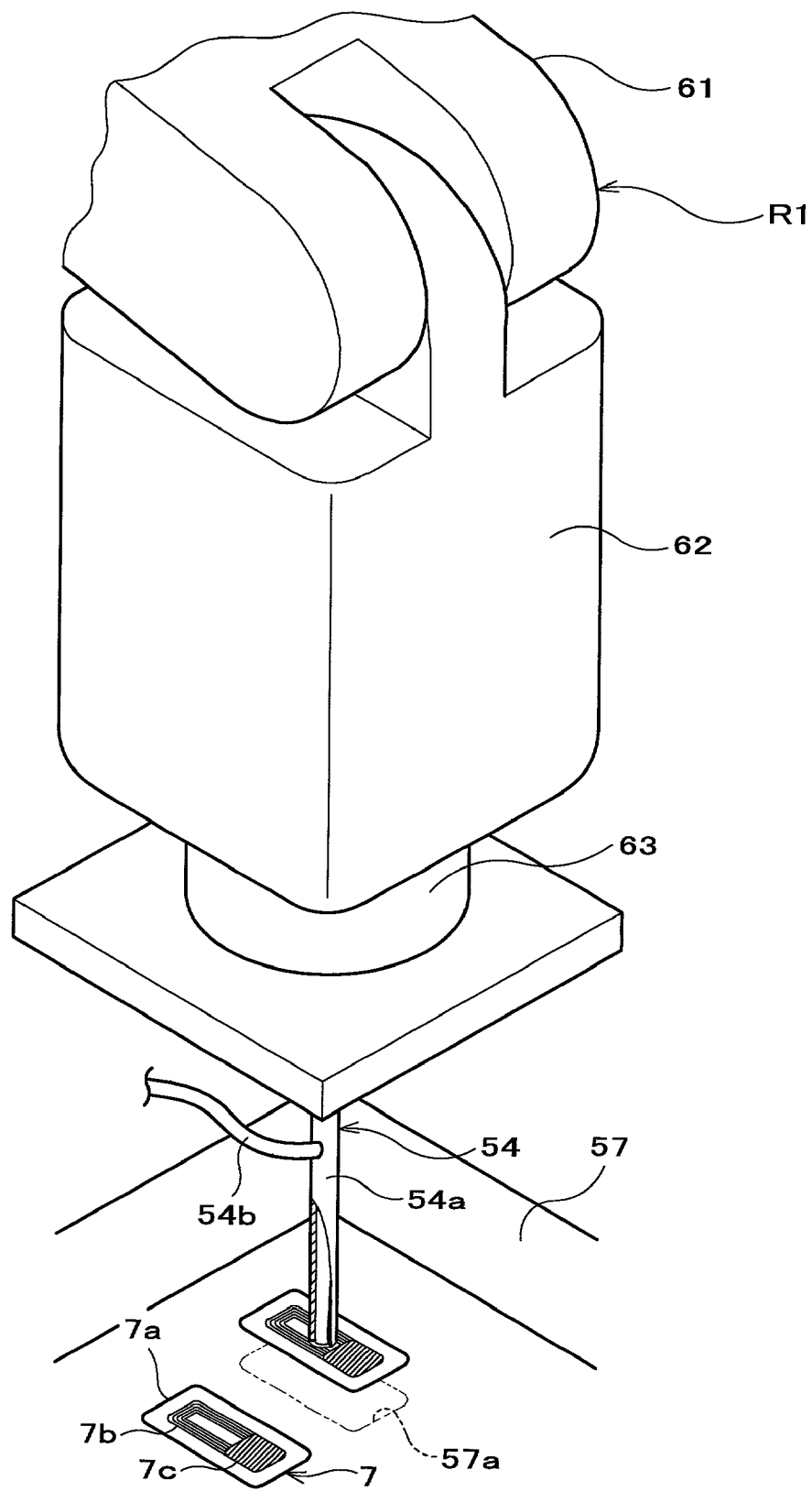
FIG. 14 is an enlarged perspective view partly illustrating a sucking means of the assembling device shown in FIG. 12.

FIG. 12 is a perspective view illustrating a cartridge memory assembling device according to a seventh embodiment of the invention, FIG. 13 is a perspective view according to the seventh embodiment, illustrating a state where a cartridge memory is assembled with a lower half, and FIG. 14 is an enlarged perspective view partly illustrating a sucking means of the assembling device shown in FIG. 12. Since the overall construction of the magnetic tape cartridge is substantially the same as that of the first embodiment, parts similar to those previously described with respect to the first embodiment are denoted by the same reference numerals and detailed description thereof will be omitted.

As shown in FIG. 13, the cartridge memory 7 comprises a thin rectangular plate-like substrate 7a made from resin, a loop antenna 7b for electromagnetic induction wired on the substrate 7a, and a non-shown IC chip for transmitting/receiving data to and from the recording/playback device through the loop antenna 7b. The IC chip is sealed for protection in a globe top 7c made from sealing resin. Therefore, the upper surface of the cartridge memory 7, viz. the surface provided with the globe top 7c, is divided into a ridge portion having the globe top 7c, and a flat portion other than the globe top 7c.

The cartridge memory 7 is obliquely assembled with the lower half 2 at an angle of 45 degrees with respect to the bottom plate 28. As shown in FIG. 13, the tilt angle is retained by the pair of retaining ribs 71 extending over the bottom plate 28 and the side wall 21b of the lower half 2 and having an inclination angle of 45 degrees. The cartridge memory 7 placed on the retaining ribs 71 is restricted its movement with the projections 78 that are formed on the bottom plate 28 and abut to the lower side 7d of the cartridge memory 7, and the restriction pins 75a that project from the bottom plate 28 and abut on both side of the cartridge memory 7. The shape, the number, and position of the retaining ribs 71, the projections 78, and the restriction pins 75a are not limited to this specific embodiment shown in FIG. 13, and they may vary when necessary.

Next, the assembling device 55 for assembling the cartridge memory 7 with the lower half 2 will be described.

As shown in FIG. 12, the assembling device 55 comprises a conveyor 56 for carrying transferring pallets 50 each loading various elements that constitute the magnetic tape cartridge, a robot R1 furnished with a suction means 54 for assembling the cartridge memory 7 with respect to the lower half 2 placed on the transferring pallet 50, and a holder 57 in which cartridge memories 7 are arranged in order.

The conveyor 56 comprises a mechanism for carrying, by means of rotation of non-shown rollers, pallets 50 each loading elements such as a lower half 2. Further, the conveyor 56 comprises a non-shown stopper pin, and extending the stopper pin enables to position and stop the transferring pallet 50.

The robot R1 furnished with the suction means 54 is an articulated robot including an upper arm 61, a forearm 62, the suction means 54, and joints such as a waist 64 for rotatably connecting the arms. Between the forearm 62 and the suction means 54, there is provided a rotation mechanism 63 for rotating the suction means 54 around its longitudinal axis. Preferably, the robot R1 is provided with a load sensor for controlling load applied to the cartridge memory 7, and a position sensor for controlling the assembling position.

As shown in FIG. 14, the suction means 54 comprises an elongated sucking tube 54a, a hose 54b fixed to the sucking tube 54a at one end and communicating therewith, a suction pump and a switch valve (both not shown) for sucking air within the sucking tube 54a through the hose 54b. When the suction pump actuates and the switch valve is opened, air within the sucking tube 54a is sucked or drawn through the hose 54b. The front end of the sucking tube 54a is open to suck ambient air. Therefore, when the front end of the sucking tube 54a contacts with the cartridge memory 7 arranged in the holder 57, the sucking tube 54a sucks the cartridge memory 7.

The holder 57 for storing cartridge memories 7 is constituted such that a number of cartridge memories 7 are equally spaced and arranged in order and preferably, recesses 57a for horizontally positioning cartridge memories 7 are formed to ease sucking the cartridge memory 7 with the sucking means 54. Furthermore, as shown in FIG. 14, each of the cartridge memories 7 is arranged within the holder 57 with the globe top 7c faced upward and lined in one direction.

Manner of operation of the aforementioned assembling device 55 will be described for assembling the cartridge memory 7 with the lower half 2 placed on the transferring pallet 50.

The operator arranges cartridge memories 7 in recesses 57a of the holder 57 in such a manner that the globe top 7c of each cartridge memory 7 faces upward and lines in a predetermined direction, and then sets this holder 57 in a predetermined position beside the robot R1. Such positioning of the cartridge memories 7 may be carried out mechanically by applying a known mounting device.

When the transferring palette 50, on which elements such as the lower half 2 have been placed, is carried with the conveyor 56, the suction means 54 of the robot R1 sucks the cartridge memory 7 in the holder 57. In other words, the assembling device 55 starts sucking ambient air from the front end of the sucking tube 54a by way of actuating the suction pump and opening the switch valve, and contacts the front end of the sucking tube 54a with the flat portion provided on the upper surface of the cartridge memory 7.

After sucking the cartridge memory 7 with the suction means 54, the robot R1 moves the upper arm 61, the forearm 62, and other elements to pick up the cartridge memory 7 from the holder 57. Further, the robot arm R1 actuates the rotation mechanism 63 and joints such as of the forearm 62 to adjust the direction of the cartridge memory 7 and the tilt angle of the cartridge memory 7, respectively.

Figure 15:
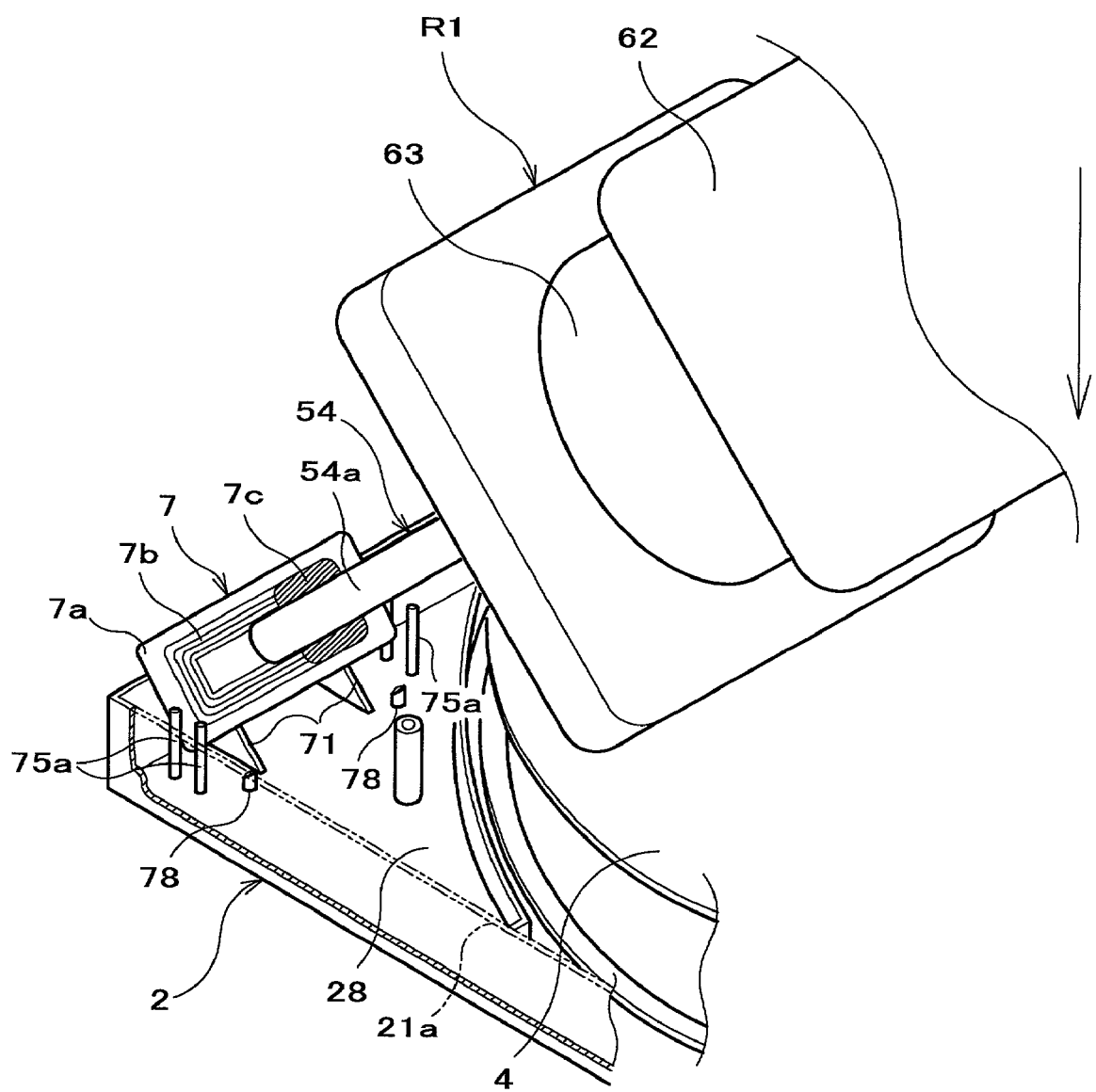
FIG. 15 is a view illustrating positions of the sucking means and the cartridge memory upon assembling the cartridge memory with the lower half.
Figure 16:
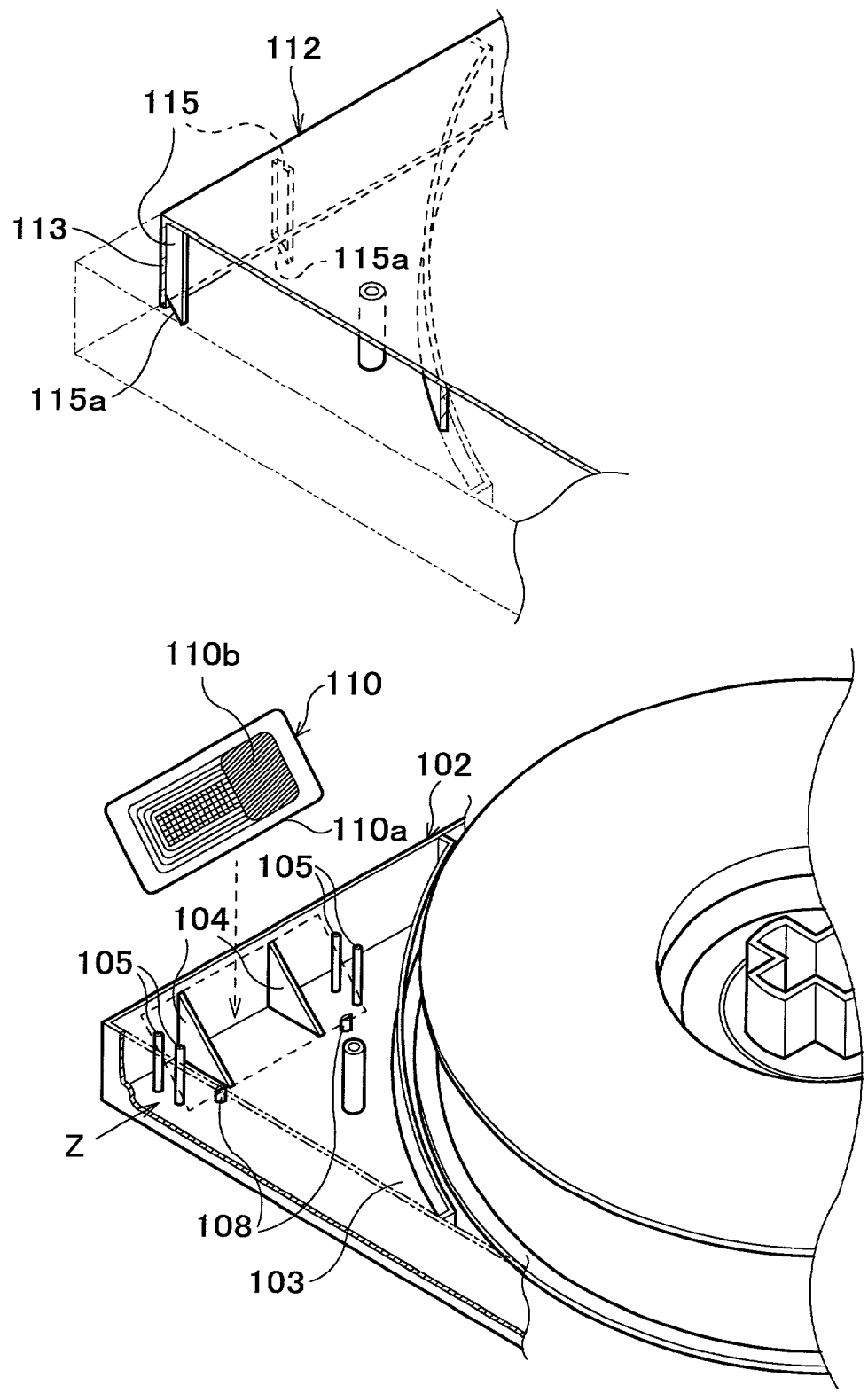
FIG. 16 is an enlarged exploded perspective view of a conventional cartridge case, partly illustrating structure where a cartridge memory is assembled.
Figure 17:
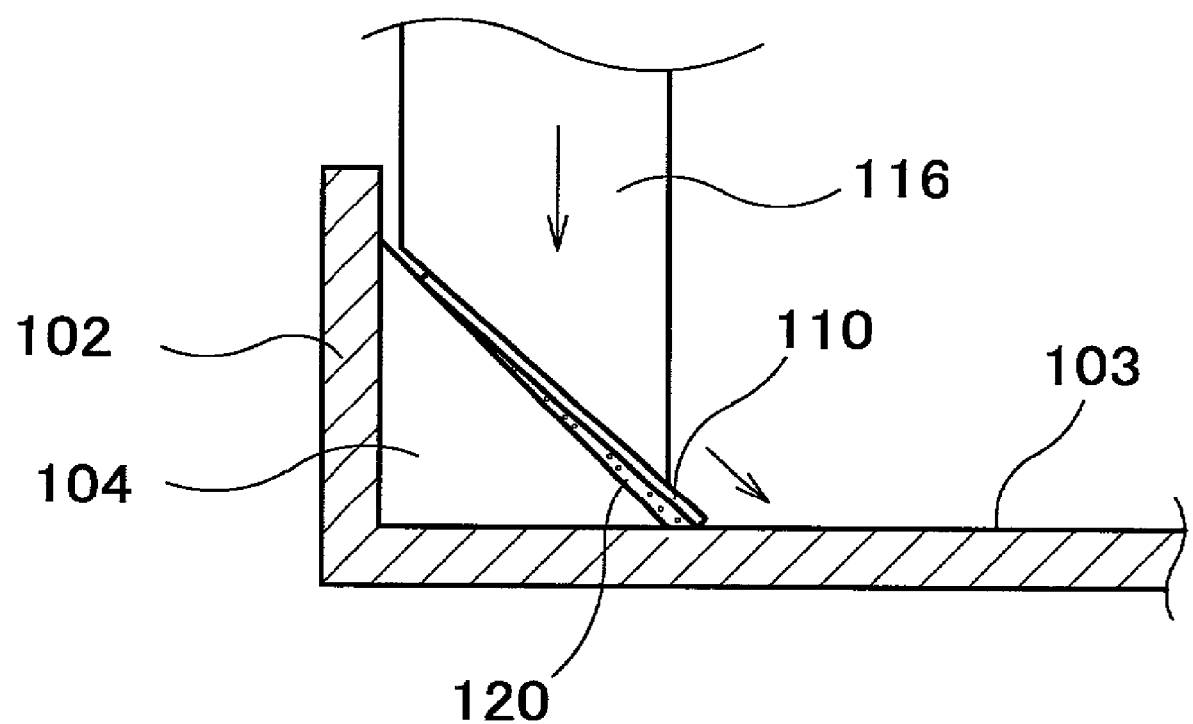
FIG. 17 is a view explaining a state where the cartridge memory is being pressed, viewing from the arrow Z of FIG. 16.

After adjusting the tilt angle of the cartridge memory 7, the robot R1 mainly rotates the waist 64, and transfers the cartridge memory 7 above the lower half 2 placed on the transferring palette 50. Subsequently, as shown in FIG. 15, the robot R1 holds the cartridge memory 7 such that the ridge portion (globe top 7c) of the cartridge memory 7 positions near the reel 4 and the flat portion positions at the side of the side wall 21a of the lower half 2, and then lowers the cartridge memory 7 to assemble the cartridge memory 7 onto the retaining ribs 71 of the lower half 2 as illustrated in FIG. 13. In this position, the switch valve is closed to stop sucking the cartridge memory 7 with the suction means 54. When elevating the suction means 54, the cartridge memory 7 remains on the retaining ribs 71 of the lower half 2, thereby completing the assembling operation of the cartridge memory 7 with the lower half 2.

When completing the assembly of the cartridge memory 7, the conveyor 56 shown in FIG. 12 carries the transferring palette 50 loading the thus assembled lower half 2 to the next operation. Subsequently, in order to prepare the next transferring palette 50 carried along the conveyor, the robot R1 rotates toward the holder 57 in which other cartridge memories 7 to be sucked are arranged.

The above operations are repeated, and a number of cartridge memories 7 are assembled one at a time onto the retaining ribs 71 of the lower half 2.

According to the seventh embodiment of the invention, it is possible to ensure assembly of the cartridge memory 7 with respect to the lower half 2. Since a number of cartridge memories 7 are arranged in order with its globe top 7c faced upward and lined in one direction, the front end of the suction means 54 always contacts with the flat portion of the cartridge memory 7 and ensures the sucking of the cartridge memory 7. Furthermore, since the suction means 54 is provided with a narrow elongated sucking tube 54a, it is possible to prevent a contact of the suction means 54 with the lower half 2 and the like, especially with the reel 4 assembled with the lower half 2. This prevents the cartridge memory 7 from falling down from the suction means 54 due to impact caused by the contact. Also, this prevents assembly of the cartridge memory 7 away from the proper assembling position. In FIG. 15, if the sucking tube 54a picks up the cartridge memory 7 at the flat portion of the cartridge memory 7 and as closely to the side wall 21a as possible, the suction means 54 is less likely to contact with the reel 2. This enables more reliable assembly of the cartridge memory 7 with the lower half 2.

While the seventh embodiment of the invention has been described in detail, the present invention is not limited to this specific embodiment.

For example, instead of having a straight tubular profile, the sucking tube 54a may be bent along the longitudinal direction so that the contact with the lower half 2 or the reel 4 is prevented much more reliably.

Moreover, the robot may comprise a hand with fingers for holding elements, and the hand may be provided with the suction means 54. In this instance, it is preferable that the robot can move the suction means 54 and the fingers separately. With this constitution, various parts are handled with a single robot.

What is claimed is:

1. A cartridge case for a magnetic tape cartridge comprising:
   a lower half comprising a bottom plate adapted to support various constituent parts, and a memory retaining portion projecting from the bottom plate at a first angle relative thereto;
   an upper half comprising supporting members for supporting the various constituent parts positioned on the lower half; and
   a plate-shaped cartridge memory arranged on the memory retaining portion of the lower half so that a first end of the plate-shaped cartridge is closer to the bottom plate of the lower half than an opposite second end of the plate-shaped cartridge, the upper half further comprising a stopper member contacting the plate-shaped cartridge memory at the first end thereof, when the upper half of the cartridge case is assembled to the lower half of the cartridge case, wherein the stopper member is dimensioned such that, when the upper half is being assembled with the lower half, the stopper member reaches a cartridge memory region before the supporting members contact with the constituent parts on the lower half.

2. A cartridge case for a magnetic tape cartridge according to claim 1, wherein the stopper member comprises a rod extending from the upper half.

3. A cartridge case for a magnetic tape cartridge according to claim 1, wherein the stopper member comprises two rods extending from the upper half to contact opposite lateral ends of the first end of the plate-shaped cartridge memory.

4. A cartridge case for a magnetic tape cartridge according to claim 1, wherein the stopper member comprises a rib extending from the upper half to contact the plate-shaped cartridge memory along its upper surface from the first side to the second side thereof.

5. A cartridge case for a magnetic tape cartridge according to claim 1, wherein the stopper member comprises two ribs that extend from the upper half to contact opposite lateral ends of the plate-shaped cartridge memory along its upper surface from the first side to the second side thereof.

6. A cartridge for a magnetic tape cartridge comprising:
a cartridge case comprising a lower half and an upper half, wherein;
the lower half comprises a memory retaining a portion such that a plate-shaped cartridge memory is positioned on the memory retaining portion with its one edge lowered so that it is obliquely supported with respect to a bottom plate of the lower half, and
the upper half comprises supporting members for supporting various non-resilient constituent parts positioned on the lower half; and
first and second stopper members such that, when the upper half is assembled with the lower half, the first stopper member reaches a cartridge memory-rising region before the supporting members contact with the non-resilient constituent parts on the lower half, and wherein the first stopper member is in contact with the one edge of the plate-shaped cartridge memory that is lowered, the second stopper member is in contact with the opposite edge of the plate-shaped cartridge memory, and an intermediate portion of an upper surface of the plate-shaped cartridge memory between the edge and the opposite edge is free from the first and second stopper members, when the upper half is assembled with the lower half.

7. The cartridge case as claimed in claim 6, wherein the upper half further comprises an upper wall and a vertical wall and the second stopper is arranged along and connected to the vertical wall and extends to the upper wall.

8. The cartridge case as claimed in claim 6, wherein the lower half further comprises a positioning rib arranged, when the upper half is assembled with the lower half, along the one edge of the plate-shaped cartridge memory on a bottom of the lower half, an end of the first stopper member contacts the plate-shaped cartridge memory at the edge and the positioning rib when the upper half is assembled with the lower half.

9. The cartridge case as claimed in claim 8, wherein the positioning rib includes a top surface opposite to the bottom of the lower half which top surface is inclined toward the plate-shaped cartridge memory such that the top surface is perpendicular to an upper surface of the plate-shaped cartridge memory, so that the upper surface at the edge and the top surface of the positioning rib receive the end of first stopper member, when the upper half is assembled with the lower half.

* * * * *